US010594905B2

(12) United States Patent
Taneda et al.

(10) Patent No.: US 10,594,905 B2
(45) Date of Patent: Mar. 17, 2020

(54) SPECTRAL CHARACTERISTIC OBTAINING APPARATUS, IMAGE FORMING APPARATUS, AND IMAGE FORMING SYSTEM

(71) Applicants: Yusuke Taneda, Kanagawa (JP); Kohei Shimbo, Kanagawa (JP); Yoichi Kubota, Tokyo (JP)

(72) Inventors: Yusuke Taneda, Kanagawa (JP); Kohei Shimbo, Kanagawa (JP); Yoichi Kubota, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/250,375

(22) Filed: Jan. 17, 2019

(65) Prior Publication Data
US 2019/0230254 A1 Jul. 25, 2019

(30) Foreign Application Priority Data

Jan. 24, 2018 (JP) ................................ 2018-009932

(51) Int. Cl.
*H04N 1/60* (2006.01)
*G01J 3/52* (2006.01)
*H04N 1/00* (2006.01)

(52) U.S. Cl.
CPC .............. *H04N 1/6097* (2013.01); *G01J 3/52* (2013.01); *G01J 3/524* (2013.01);
(Continued)

(58) Field of Classification Search
CPC ............. G06K 15/027; G06K 15/1878; H04N 1/6027; H04N 1/6041; H04N 1/6044;
(Continued)

(56) References Cited

U.S. PATENT DOCUMENTS 5,303,165 A * 4/1994 Ganz .......................... G01J 3/28
356/319
7,796,297 B2 * 9/2010 Pollard .............. H04N 1/02815
358/1.9
(Continued)

FOREIGN PATENT DOCUMENTS

EP 2642741 9/2013
JP 2013-142644 7/2013
JP 2015-232540 12/2015

OTHER PUBLICATIONS

Extended European Search Report for 19152793.6 dated Jul. 1, 2019.

*Primary Examiner* — Negussie Worku
(74) *Attorney, Agent, or Firm* — IPUSA, PLLC

(57) ABSTRACT

A spectral characteristic obtaining apparatus includes a color information obtaining unit including a plurality of spectral sensors aligned in an array direction, the spectral sensors being configured to receive light reflected from an object so as to obtain first color information of the object; a spectral characteristic calculating unit configured to estimate a spectral characteristic of the object based on the first color information by using a preset transformation matrix; a calibration color index configured to include a region of a color with a known spectral characteristic; and a transformation matrix calibrating unit configured to calibrate the transformation matrix by using second color information obtained from the calibration color index, wherein the spectral sensors are configured to obtain the second color information from the same region included in the calibration color index, while relative positions thereof with respect to the calibration color index are changed at a time of calibration.

15 Claims, 17 Drawing Sheets

(52) U.S. Cl.
CPC ..... *H04N 1/00689* (2013.01); *H04N 1/00692* (2013.01); *H04N 1/00726* (2013.01); *H04N 1/00734* (2013.01); *H04N 1/603* (2013.01); *H04N 1/6055* (2013.01)

(58) Field of Classification Search
CPC ........ H04N 1/6097; G01J 3/28; G01J 3/2803; G01J 3/52; G01J 3/524; G01N 21/276; G01N 21/278; G01N 21/4788
USPC .................................. 358/1.9, 500, 475, 509
See application file for complete search history.

(56) References Cited

U.S. PATENT DOCUMENTS

| | | | |
|---|---|---|---|
| 8,363,217 B2 | 1/2013 | Seo et al. | |
| 8,472,019 B2 | 6/2013 | Seo et al. | |
| 8,497,988 B2 | 7/2013 | Shimbo et al. | |
| 8,559,005 B2 | 10/2013 | Shimbo et al. | |
| 8,593,628 B2 | 11/2013 | Shimbo et al. | |
| 8,755,046 B2 | 6/2014 | Shimbo et al. | |
| 8,879,057 B2 | 11/2014 | Shimbo et al. | |
| 8,908,176 B2 | 12/2014 | Kubota et al. | |
| 8,964,176 B2 | 2/2015 | Kamijo et al. | |
| 8,964,250 B2 * | 2/2015 | Alleysson | H04N 9/045 358/1.9 |
| 9,068,893 B2 | 6/2015 | Seo et al. | |
| 9,197,761 B2 | 11/2015 | Kamijo et al. | |
| 9,222,833 B2 | 12/2015 | Seo et al. | |
| 9,224,080 B2 | 12/2015 | Kubota et al. | |
| 9,677,938 B2 | 6/2017 | Shimbo et al. | |
| 2007/0140539 A1 * | 6/2007 | Katsumata | A61B 1/0676 382/128 |
| 2008/0026340 A1 * | 1/2008 | Gerlach | A61B 5/0088 433/29 |
| 2010/0289835 A1 * | 11/2010 | Holub | G01J 3/02 345/690 |
| 2012/0070200 A1 | 3/2012 | Hyoki | |
| 2012/0154627 A1 * | 6/2012 | Rivard | G03B 15/02 348/224.1 |
| 2012/0253727 A1 * | 10/2012 | Lianza | G01J 3/462 702/104 |
| 2015/0235114 A1 * | 8/2015 | Kubota | G06K 15/1878 358/1.9 |
| 2015/0248597 A1 * | 9/2015 | Matsumoto | H04N 1/48 358/1.9 |
| 2016/0261839 A1 * | 9/2016 | Holub | G01J 3/02 |
| 2016/0277643 A1 * | 9/2016 | Fukunaga | H04N 1/6047 |
| 2018/0013924 A1 * | 1/2018 | Komatsu | H04N 1/00005 |

\* cited by examiner

FIG.10

| SPECTRAL SENSORS / REGIONS OF COLORS | $40_1$ | $40_2$ | $40_3$ | ... |
|---|---|---|---|---|
| $52_1$ | L*a*b*... | L*a*b*... | L*a*b*... | ... |
| $52_2$ | L*a*b*... | L*a*b*... | L*a*b*... | ... |
| $52_3$ | L*a*b*... | L*a*b*... | L*a*b*... | ... |
| ... | ... | ... | ... | ... |

SPECTRAL CHARACTERISTIC OBTAINING APPARATUS, IMAGE FORMING APPARATUS, AND IMAGE FORMING SYSTEM

CROSS-REFERENCE TO RELATED APPLICATION

The present application claims priority under 35 U.S.C. § 119 to Japanese Patent Application No. 2018-009932, filed on Jan. 24, 2018, the entire contents of which are incorporated herein by reference.

BACKGROUND OF THE INVENTION

1. Field of the Invention

The disclosures herein generally relate to a spectral characteristic obtaining apparatus, an image forming apparatus, and an image forming system.

2. Description of the Related Art

In recent years, there has been a demand for full color electrophotographic and inkjet image forming apparatuses (such as printers and copiers) that can print high-quality color images on an image bearer such as paper. Thus, improving color reproducibility is one of the most important technical goals.

For the purpose of such improvement in color reproducibility, a technique is known that calculates spectral characteristics of an image formed on an image bearer based on a signal output from a plurality of spectral sensors, which are aligned in a direction perpendicular to a conveyance direction of the image bearer, by using a preset transformation matrix.

Further, a technique is disclosed that calibrates a transformation matrix based on a signal output from spectral sensors by using a calibration color index with known spectral characteristics (see Patent Document 1, for example).

In an apparatus disclosed in Patent Document 1, in order to calibrate the transformation matrix by using the calibration color index, a calibration color index having a length greater than or equal to that of an array of the spectral sensors is required. However, if the length of the array of the spectral sensors is long depending on an object such as paper, it becomes difficult to produce a calibration color index having uniform spectral characteristics over a wide range. Accordingly, there may be cases in which the transformation matrix fails to be accurately calibrated due to nonuniformity in spectral characteristics of the calibration color index.

RELATED-ART DOCUMENTS

Patent Document

[Patent Document 1] Japanese Unexamined Patent Application Publication No. 2015-232540

SUMMARY OF THE INVENTION

According to at least one embodiment, a spectral characteristic obtaining apparatus includes a color information obtaining unit including a plurality of spectral sensors aligned in an array direction, the plurality of spectral sensors being configured to receive light emitted to and reflected from an object so as to obtain first color information of the object; a spectral characteristic calculating unit configured to estimate a spectral characteristic of the object based on the first color information by using a preset transformation matrix; a calibration color index configured to include a region of a color with a known spectral characteristic; and a transformation matrix calibrating unit configured to calibrate the transformation matrix by using second color information obtained from the calibration color index, wherein the plurality of spectral sensors are configured to obtain the second color information from the same region included in the calibration color index, while relative positions of the plurality of spectral sensors with respect to the calibration color index in the array direction are changed at a time of calibration.

BRIEF DESCRIPTION OF THE DRAWINGS

FIG. 10 is a table illustrating an example in which an array of the color information data obtained from the calibration color index by the spectral characteristic obtaining apparatus according to the first embodiment has been corrected;

DESCRIPTION OF THE PREFERRED EMBODIMENTS

Figure 1:
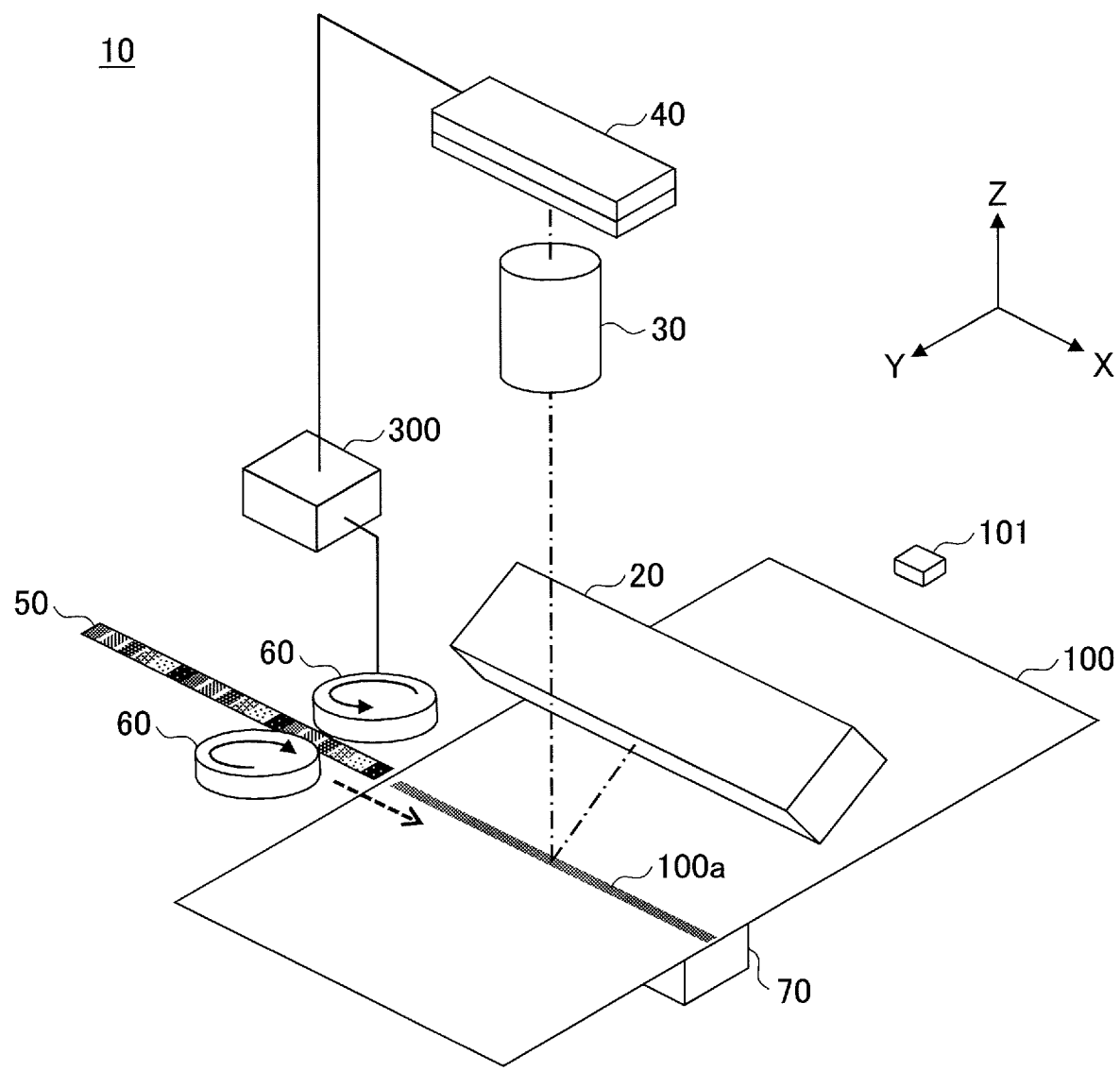
FIG. 1 is a perspective view illustrating a usage example of a spectral characteristic obtaining apparatus according to a first embodiment.

It is a general object of at least one embodiment of the present invention to accurately calibrate a transformation matrix used for calculation of spectral characteristics, even if an array of spectral sensors is long depending on an object.

In the following, embodiments of the present invention will be described with reference to the accompanying drawings. In the drawings, the same elements are denoted by the same reference numerals and a duplicate description thereof may be omitted.

In the following embodiments, an example will be described in which an object from which to obtain spectral characteristics is regarded as an image bearer such as paper. The object from which to obtain spectral characteristics is simply referred to as an object. Also, in the drawings indicating directions with continuous line arrows, an x-axis direction indicates an array direction of spectral sensors, a y-axis direction indicates a conveyance direction of an object, and a z-axis direction indicates a direction perpendicular to the X-Y plane. The x-axis direction is an example of the "array direction".

First Embodiment

A first embodiment will be described with reference to the drawings. FIG. 1 is a perspective view illustrating a usage example of a spectral characteristic obtaining apparatus according to the present embodiment.

In FIG. 1, a spectral characteristic obtaining apparatus 10 includes a linear illumination light source 20, a reduction imaging lens 30, a color information obtaining unit 40, a calibration color index 50, a calibration color index conveying unit 60, a controller 300, and an object detecting sensor 101.

An object 100 is conveyed in the y-axis direction at a constant speed. The object detecting sensor 101 detects whether the object 100 is conveyed to the vicinity of a color information acquiring region 100a. To be more specific, the object detecting sensor 101 irradiates the object 100 with light and detects reflected light with, for example, a photodiode. In this way, the object detecting sensor 101 detects the presence or absence of the object 100. The object 100 is an example of an "object" and is also an example of a "conveyance object".

The calibration color index 50 is used to calibrate a transformation matrix. The transformation matrix is used to calculate spectral characteristics. The calibration color index conveying unit 60 conveys the calibration color index 50 in the x-axis direction, namely in a direction indicated by a dashed line arrow in FIG. 1.

The calibration color index conveying unit includes two rollers to which respective rotary driven motors are coupled. The calibration color index 50 sandwiched between the rollers is conveyed in the x-axis direction by friction force generated by rotation. Pulleys may be coupled to the rollers.

It is possible to change a relative position between the calibration color index 50 and the color information obtaining unit 40 in the x-axis direction by conveying the calibration color index 50. The calibration color index 50 and the calibration color index conveying unit 60 will be described later.

The spectral characteristic obtaining apparatus 10 can simultaneously obtain spectral characteristics at a plurality of positions in the x-axis direction of the color information acquiring region 100a.

The linear illumination light source 20 irradiates the color information acquiring region 100a with linear light in a direction inclined at an angle of approximately 45 degrees with respect to a normal direction of the object 100. The linear illumination light source 20 irradiates an appropriate region of the color information acquiring region 100a such that light reflected from a region other than the color information acquiring region 100a of the object 100 does not enter the color information obtaining unit 40.

For example, as the linear illumination light source 20, a white light emitting diode (LED) array having intensity over approximately the full range of visible light may be used. However, the present invention is not limited thereto, and a fluorescent lamp such as a cold-cathode tube, a lamp light source, or the like may be used as the linear illumination light source 20, for example.

It is preferable to use a linear illumination light source 20 that emits light within a wavelength range necessary for spectrometry and that is capable of uniformly irradiating the entire color information acquisition region. Further, a collimator lens that condenses light emitted from the linear illumination light source 20 and irradiates the object 100 with parallel light or converged light may be provided.

The reduction imaging lens 30 is disposed such that the optical axis of the reduction imaging lens 30 coincides with the normal direction of the object 100. The reduction imaging lens 30 has a function to condense light, reflected from the object 100, namely light fluxes reflected from the object 100, onto an incident surface at a predetermined magnification. By providing the reduction imaging lens 30 with an image-side telecentric characteristic, a principal ray of each light flux incident on an imaging surface becomes substantially parallel to the optical axis. The reduction imaging lens 30 may be composed of a plurality of lenses.

Providing the reduction imaging lens 30 with an image-side telecentric characteristic makes it easy for a principal ray of each light flux incident on an imaging surface to become substantially parallel to the optical axis. However, the reduction imaging lens 30 is not required to be provided with an image-side telecentric characteristic. In that case, a similar effect can be obtained by adjusting a positional relationship between pinholes of a pinhole array 41 and lenses of a lens array 42, which will be described later, in accordance with an inclination of a principal ray at each position of the imaging surface.

The color information obtaining unit 40 has a function to spectrally disperse light that is diffusely reflected from the object 100, and has a function to receive the spectrally dispersed light and output signals. By referring to FIG. 2, the color information obtaining unit 40 will be described in detail.

FIG. 1 illustrates what is known as a 45/0 optical system in which illumination light emitted from the linear illumination light source 20 enters the object 100 obliquely at approximately 45 degrees and the color information obtaining unit 40 receives light diffusely reflected from the object 100 in the vertical direction. However, the configuration of the optical system is not limited to that illustrated in FIG. 1. For example, the optical system may be what is known as a 0/45 optical system in which illumination light emitted from the linear illumination light source 20 is perpendicularly incident on the object 100 and the color information obtaining unit 40 receives light diffusely reflected from the object 100 in a direction of 45 degrees.

Figure 2:
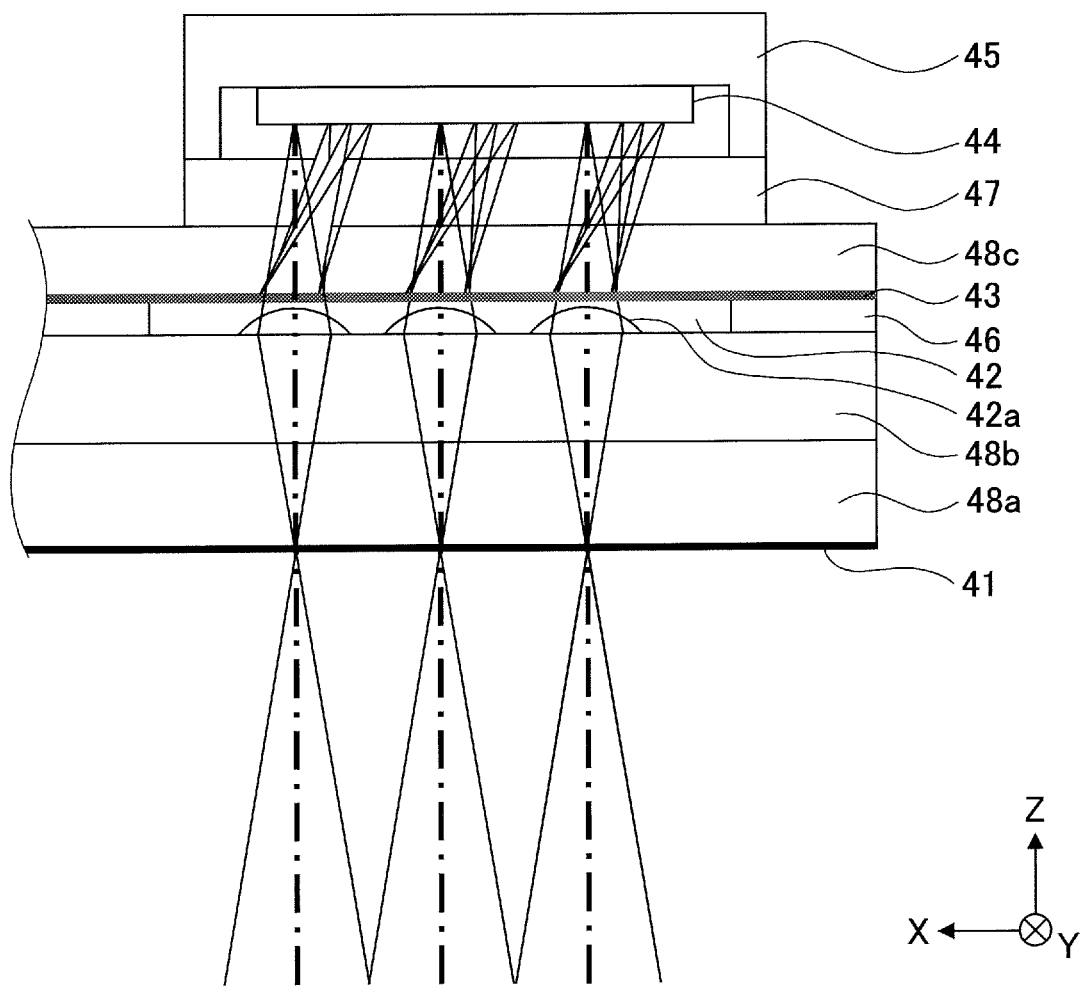
FIG. 2 is a diagram illustrating an example of a configuration of a color information obtaining unit according to the first embodiment.

Next, referring to FIG. 2, a configuration of the color information obtaining unit 40 will be described. FIG. 2 is a cross-sectional view illustrating the color information obtaining unit according to the first embodiment, and illustrates a part of a cross section perpendicular to the x-z plane of the color information obtaining unit.

In FIG. 2, the color information obtaining unit 40 includes the pinhole array 41, the lens array 42, a diffraction element 43, and an imaging element 44. Also, the color information obtaining unit 40 includes a package 45, a spacer 46, a cover glass 47, and glass bases 48a through 48c.

The pinhole array 41 has pinholes as apertures through which light reflected from the object 100 passes. The pinholes are arranged at imaging positions where light coming from the reduction imaging lens 30 in the z-axis direction is imaged. The pinholes are arranged in an array at predetermined intervals in the x-axis direction. FIG. 2 illustrates an example in which three pinholes are arranged in the x-axis direction.

The pinhole array 41 is integrally provided on the flat-plate-shaped transparent glass base 48a that serves as a light transmissive frame. The pinhole array 41 is formed in such a manner that a metallic thin film such as nickel is deposited onto a transparent glass base and apertures serving as pinholes are arranged in an array on the transparent glass base. Light fluxes reflected from respective positions of the color information acquiring region 100a of the object 100 pass through the pinholes arranged on the pinhole array 41.

The configuration of the color information obtaining unit 40 is not limited to the configuration including the pinhole array 41. The color information obtaining unit 40 may be configured to include a slit array having rectangular apertures or include an oblique slit array having rectangular slits inclined in the x-axis direction.

A surface of a flat-plate-shaped transparent glass base 48b as a light transmissive frame is bonded to a surface of the glass base 48a that is on the opposite side of a surface on which light reflected from the object 100 is incident. Also, on a surface of the glass base 48b on the opposite side of the surface bonded to the glass base 48a, lenses are arranged in an array at predetermined intervals in the x-axis direction. FIG. 2 illustrates an example of the lens array 42 in which three lenses are arranged in the x-axis direction. The lenses of the lens array 42 condense light fluxes that have passed through the respective pinholes of the pinhole array 41, and form images on the imaging element 44.

The lens array 42 has a plurality of lenses 42a arranged in an array in the x-axis direction. The lenses 42a of the lens array 42 have functions to convert diffused light fluxes that have passed through the respective apertures of the pinhole array 41 into weakly diffused light fluxes.

A "weakly diffused light flux" refers to a diffused light flux that is closer to a parallel light flux, as compared to when the diffused light flux is incident. Namely, a "weakly diffused light flux" is a diffused light flux whose degree of diffusion becomes lower or weaker, as compared to when the diffused light flux is incident.

The lenses 42a of the lens array 42 are arranged at positions corresponding to the respective apertures of the pinhole array 41. The lenses 42a have diameters that allow all light having passed through the respective apertures to be incident on the lenses 42a. However, the shape of the lenses 42a in planar shape is not required to be a circular shape.

In the present embodiment, the pinhole array 41 and the lens array 42 are disposed through the glass bases 48a and 48b; however, the present embodiment is not limited thereto. The thickness of the glass bases 48a and 48b is determined such that an optical path length between the pinhole array 41 and the lens array 42 is shorter than an object-side focal length of the lenses 42a of the lens array 42. In the lens array 42, it is preferable to block light in areas other than openings on the lenses 42a so as to eliminate stray light.

A flat-plate-shaped transparent glass base 48c serving as a light transmissive frame is disposed facing the lens array 42 in the z-axis direction. The glass base 48b and the glass base 48c are bonded to each other through the spacer 46.

The spacer 46 is a member for providing a predetermined interval, namely a space between the glass base 48b and the glass base 48c. For example, the spacer 46 is a metallic flat plate having predetermined through holes. A part of the surface of the spacer 46 that faces the lens array 42 and that does not correspond to the through hole makes contact with and is bonded to a part of the glass base 48b on which the lenses are not provided. Also, a part of the other surface of the spacer 46 that faces the diffraction element 43 and that does not correspond to the through hole makes contact with and is bonded to a part of the glass base 48c. Accordingly, a predetermined interval, namely a space is provided between the glass base 48b and the glass base 48c. The through hole may be a small hole that fits each of the lenses of the lens array 42, or may be a large hole that fits plural lenses.

The diffraction element 43 is provided on the surface of the glass base 48c that faces the lens array 42, namely on which light reflected from the object 100 is incident. The diffraction element 43 is formed by forming a sawtooth shape with a predetermined interval on the surface of the glass base 48c. The diffraction element 43 functions as a diffraction grating that diffracts and spectrally disperses incident light. The diffraction element 43 spectrally disperses light fluxes that have transmitted through the respective lenses of the lens array 42. Diffraction images corresponding to the respective light fluxes are formed on the imaging element 44.

As the diffraction element 43, a blazed diffraction grating having high diffraction efficiency for 1st order diffraction light is preferably used. By using a blazed diffraction grating as the diffraction element 43, it becomes possible to increase diffraction efficiency for 1st order diffraction light, thereby improving light use efficiency of the optical system. Accordingly, a sufficiently accurate signal can be obtained in a short period of time, thus shortening the time required to obtain spectral characteristics.

The imaging element 44 is a line sensor having a plurality of pixels aligned in the x-axis direction. A plurality of light receivers disposed at different locations receive diffraction images formed by the lens array 42 and the diffraction element 43, allowing the imaging element 44 to obtain a light intensity in each predetermined wavelength band. For example, the imaging element 44 may be a metal oxide semiconductor (MOS) device, a complementary metal oxide semiconductor (CMOS) device, or a charge coupled device.

Figure 3:
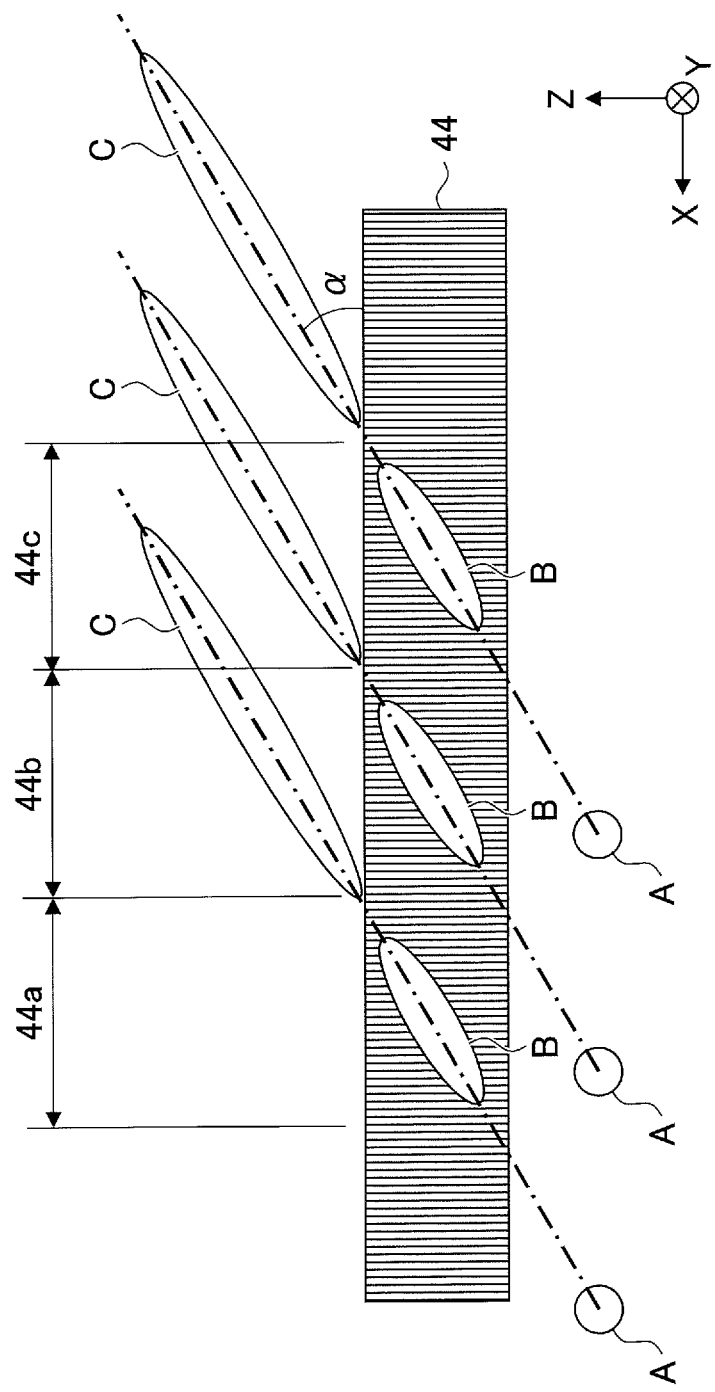
FIG. 3 is a diagram illustrating diffraction images received by an imaging element of a spectral characteristic obtaining apparatus according to the first embodiment.

A diffraction axis of the diffraction element 43 is inclined at an angle α with respect to the x-axis direction. As illustrated in FIG. 3, a diffraction image inclined at the angle α with respect to the x-axis direction is incident on the imaging element 44. In FIG. 3, three diffraction patterns each having a 0th order diffraction image A, a +1st order diffraction image B, and a +2nd diffraction image C are arranged side by side. The diffraction patterns are arranged such that the 1st order diffraction images B are received by the imaging element 44. In FIG. 3, three 1st order diffraction images formed by three lens arrays are received in respective pixel regions 44a, 44b, and 44c by the imaging element 44, and converted into electric signals. The electric signals are output as color information data obtained by the color information obtaining unit 40.

As described above, in the spectral characteristic obtaining apparatus 10, crosstalk caused by overlapping of diffraction images can be prevented, and spectral characteristics of the object 100 can be obtained from +1st order diffraction images B. In the following description, a +1st order diffraction image B may be simply referred to as a diffraction image.

The imaging element 44 is fixed to the inside of the package 45, and an opening of the package 45 is covered by the transparent cover glass that serves as a light transmissive frame. The cover glass 47 is bonded to the surface of the glass base 48c on which the diffraction element 43 is not formed.

From an optical point of view, one pinhole of the pinhole array 41, one corresponding lens of the lens array 42, a part of the diffraction element through which a light flux is transmitted, and a part of a pixel array of the imaging element 44 function as one spectrometer. Such parts functioning as one spectrometer is hereinafter referred to as a spectral sensor.

In FIG. 2 and FIG. 3, only three spectral sensors are illustrated. However, the present embodiment is not limited thereto, and a plurality of spectral sensors may be provided. For example, if an imaging element 44 having 1,024 pixels is used and the number of pixels included in the above-described part of the pixel array is set to 10 pixels, 102 spectral sensors may be provided.

In an optical system that is used for spectrometry and constitutes the color information obtaining unit 40, a relative positional deviation between a diffraction image, which is formed by the pinhole array 41, the lens array 42, and the diffraction element 43, and the imaging element 44 largely affects accuracy of obtaining spectral characteristics. In the present embodiment, in order to suppress such a positional deviation, the pinhole array 41, the lens array 42, the diffraction element 43, and the imaging element 44 are stacked in the optical axis direction of the reduction imaging lens 30, and are integrally bonded to each other.

Figure 4:
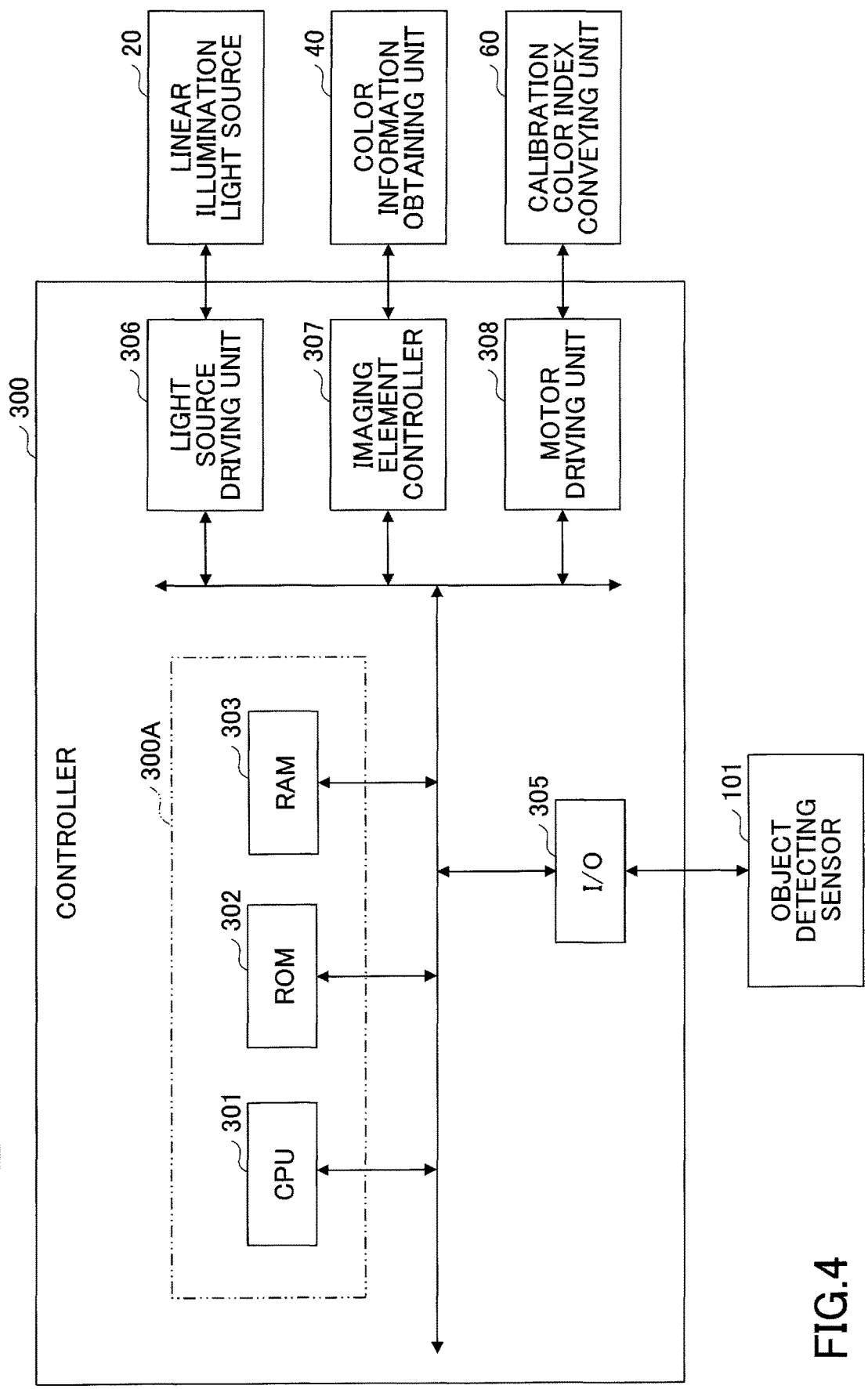
FIG. 4 is a block diagram illustrating an example of a hardware configuration of the spectral characteristic obtaining apparatus according to the first embodiment.

Next, referring to FIG. 4, an overview of the controller 300 of the spectral characteristic obtaining apparatus 10 will be described. FIG. 4 is a block diagram illustrating an example of a hardware configuration of the spectral characteristic obtaining apparatus 10 according to the present embodiment.

The controller 300 includes a main controller 300A, an input/output (I/O) 305, a light source driving unit 306, and imaging element controller 307, and a motor driving unit 308.

The main controller 300A includes a central processing unit (CPU) 301, read-only memory (ROM) 302, and random-access memory (RAM) 303.

The CPU 301 controls the entire spectral characteristic obtaining apparatus 10. The ROM 302 stores programs that cause the CPU 301 to control the spectral characteristic obtaining apparatus 10, and also stores other fixed data. The RAM 303 temporarily stores data such as obtained color information data.

The I/O 305 inputs signals such as a detection signal obtained by the object detecting sensor.

The light source driving unit 306 is an electric circuit that outputs a drive signal, including a drive voltage, for illuminating the linear illumination light source 20 in accordance with an input control signal.

The imaging element controller 307 controls light reception and acquisition of color information data by the imaging element 44 in accordance with an input control signal. The obtained color information data is stored in the RAM 303.

The motor driving unit 308 is an electric circuit that outputs a drive signal, including a drive voltage, to the motors for actuating the calibration color index conveying unit 60 in accordance with an input control signal.

The controller 300 implements a function to estimate and calculate spectral characteristics of the object 100, from color information data output from the color information obtaining unit 40, by using a transformation matrix.

Control processing performed by the CPU may be partly or entirely implemented by an electronic circuit such as a field-programmable gate array (FPGA) or an application-specific integrated circuit (ASIC).

Figure 5:
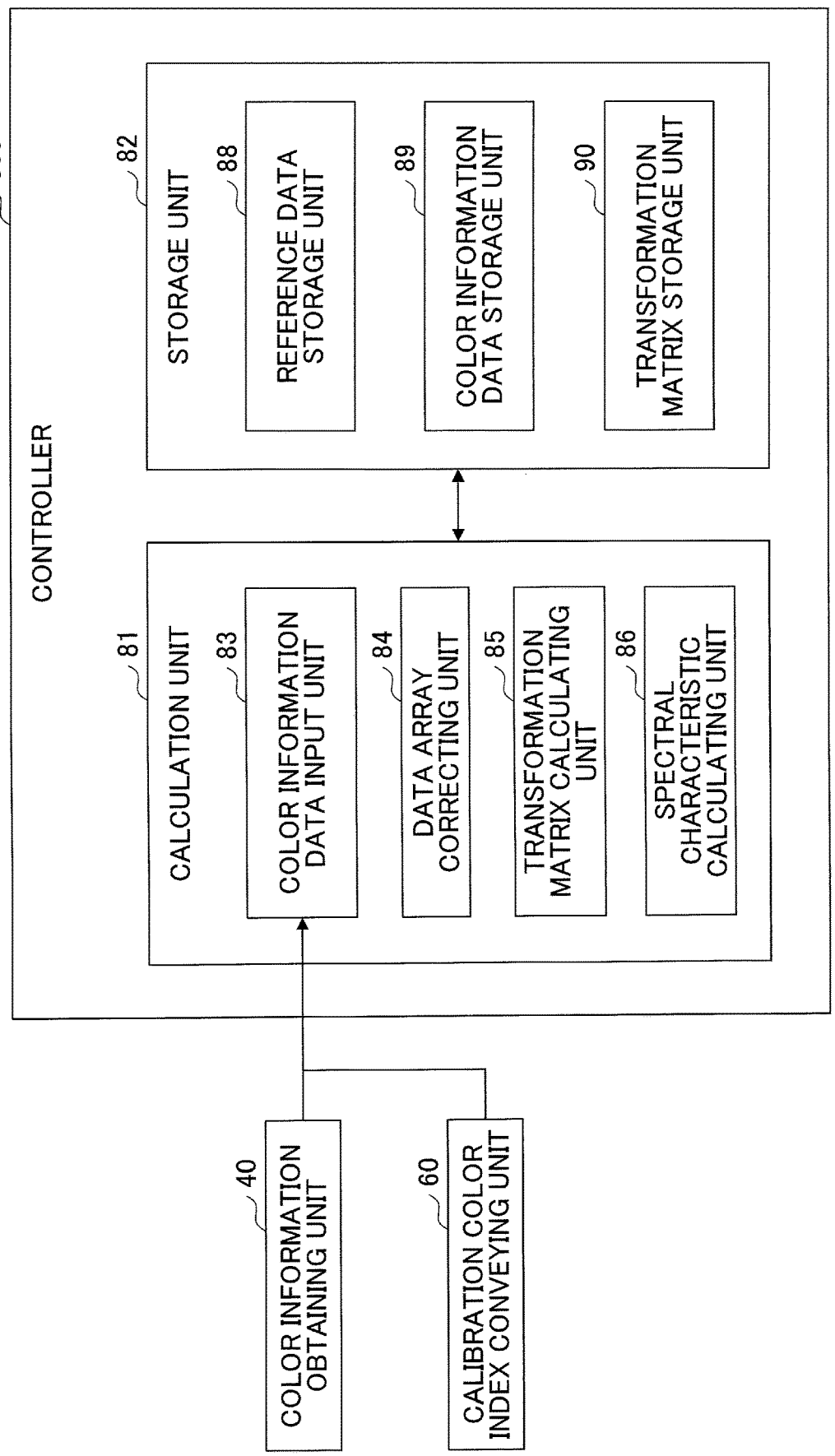
FIG. 5 is a block diagram illustrating an example of a functional configuration of a controller of the spectral characteristic obtaining apparatus according to the first embodiment.

FIG. 5 is a block diagram illustrating an example of a functional configuration of the controller 300 for estimating and calculating spectral characteristics.

The controller 300 includes a calculation unit 81 and a storage unit 82. The calculation unit 81 includes a color information data input unit 83, a data array correcting unit 84, a transformation matrix calculating unit 85, and a spectral characteristic calculating unit 86. The storage unit 82 includes a reference data storage unit 88, a color information data storage unit 89, and a transformation matrix storage unit 90. In the following, functions of the units included in the calculation unit 81 as well as a method for estimating and calculating a spectral reflectance distribution as spectral characteristics of the object 100 will be described.

In the spectral characteristic obtaining apparatus 10, when the linear illumination light source 20 irradiates the object 100 with light, spectral sensors of the color information obtaining unit 40 that have received diffraction images output electric signals, and the electric signals are input into the color information data input unit 83 of the controller 300 as color information data.

Upon the color information data being input into the color information data input unit 83, the spectral characteristic calculating unit 86 calculates spectral characteristics of the object 100 from the color information data, by using a preliminarily stored transformation matrix. The spectral characteristic calculating unit 86 is an example of a "spectral characteristic calculating unit".

In the present embodiment, a method in which the spectral characteristic calculating unit 86 estimates and calculates a spectral reflectance distribution as spectral characteristics from color information data obtained by one spectral sensor of the color information obtaining unit 40 will be described. Spectral characteristics may be obtained by a method different from that described below.

Color information data $v_i$ (i=1 to N) is obtained from the N number of pixels constituting one spectral sensor of the color information obtaining unit 40 and is stored in a matrix V. A matrix r that stores spectral reflectances in each wavelength band (for example, 31 spectral reflectances in the 400 nm to 700 nm wavelength band at a 10-nm pitch) is expressed by the following formula (1):

$$r = Gv \quad \text{(Formula 1)}$$

As illustrated in the following formulas (2) through (4), a transformation matrix G is calculated from a matrix R that stores spectral reflectance distributions of a plurality of (the n number of) known standard samples and from a matrix V that stores color information data v obtained from the spectral sensor and the standard samples, where the square norm of error $\|\ldots\|^2$ is minimized by using a least square method.

$$R = [r1, r2, \ldots, rn] \quad \text{(Formula 2)}$$

$$V = [v1, v2, \ldots, vn] \quad \text{(Formula 3)}$$

$$e = \|R - GV\|^2 \to \min \quad \text{(Formula 4)}$$

For example, a transformation matrix G of a regression equation from V to R, where V is an explanatory variable and R is a response variable, is calculated by following formula (5) by using a Moore-Penrose generalized inverse matrix that gives a square minimum norm solution of the matrix V.

$$G = RV^T (VV^T)^{-1} \quad \text{(Formula 5)}$$

In the formula (5), a superscript T denotes a transpose of a matrix and a superscript −1 denotes an inverse matrix.

In the spectral characteristic obtaining apparatus 10, spectral reflectances obtained from the standard samples are preliminarily stored in the reference data storage unit 88 of the controller 300.

In the spectral characteristic obtaining apparatus 10, the transformation matrix calculating unit 85 produces a matrix $V_{ref}$ based on color information data obtained from the standard samples. Furthermore, the transformation matrix calculating unit 85 produces a matrix $R_{ref}$ based on spectral reflectance distributions of the standard samples stored in the reference data storage unit 88. The transformation matrix calculating unit 85 calculates a transformation matrix G from the matrices $V_{ref}$ and $R_{ref}$ produced as described above, by using the formula (5).

The transformation matrix G calculated by the transformation matrix calculating unit 85 is stored in the transformation matrix storage unit 90. Further, in the spectral characteristic obtaining apparatus 10, the matrix $V_{ref}$ of the color information data obtained from the standard samples are stored in the color information data storage unit 89 of the controller 300.

When spectral characteristics of the object 100 are estimated, the spectral characteristic calculating unit 86 first produces a matrix $V_{exp}$ from color information data of the object 100 and obtains a transformation matrix G stored in the transformation matrix storage unit 90. Then, the spectral characteristic calculating unit 86 estimates and calculates spectral characteristics $R_{exp}$ from the matrix $V_{exp}$ and the transformation matrix G, by using the formula (2).

In the above described estimation and calculation method, it is desirable for a plurality of standard samples used for calculation of a transformation matrix G to be uniformly selected from a range (gamut) of colors that can be reproduced in a color space such as the XYZ color space or the L*a*b* color space for printed images. A transformation matrix G calculated from such standard samples allows spectral characteristics of a printed image on the object 100 to be estimated with high accuracy.

However, it takes a lot of time and cost to create, maintain, and measure standard samples. Therefore, it is desirable to calculate a transformation matrix G from a small number of standard samples as long as estimation accuracy for spectral characteristics can be maintained.

Figure 6:
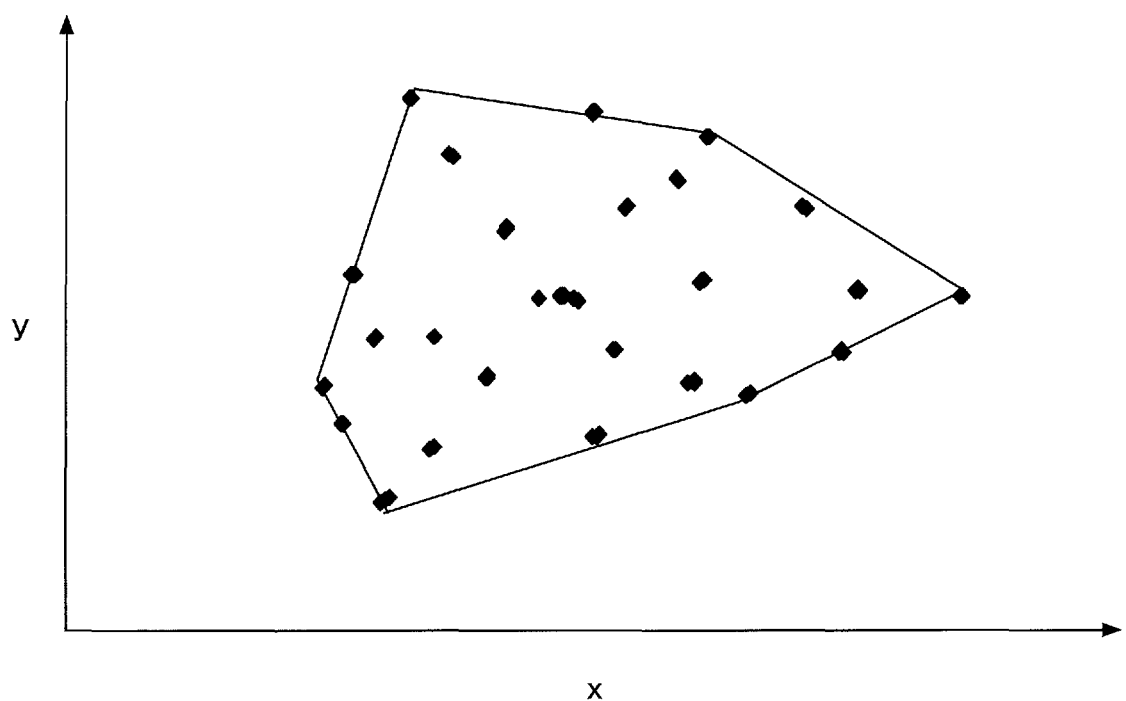
FIG. 6 is a diagram illustrating an example of an XY chromaticity distribution of each standard sample and a range of color reproduction of a toner image.

As standard samples, toner images of 27 colors that are uniformly selected from the range of colors that can be reproduced by an electrophotographic image forming apparatus may be used. FIG. 6 is a diagram illustrating XY chromaticity of each of the standard samples of 27 colors. A point indicates XY chromaticity of each of the standard samples and a continuous line indicates the range of color that can be reproduced for the toner images. FIG. 6 indicates that the standard samples are uniformly selected from the range of color that can be reproduced for the toner images.

In the spectral characteristic obtaining apparatus 10, a transformation matrix G is calculated by the transformation matrix calculating unit 85 from standard samples selected as described above, and is preliminarily stored in the transformation matrix storage unit 90.

Figure 7:
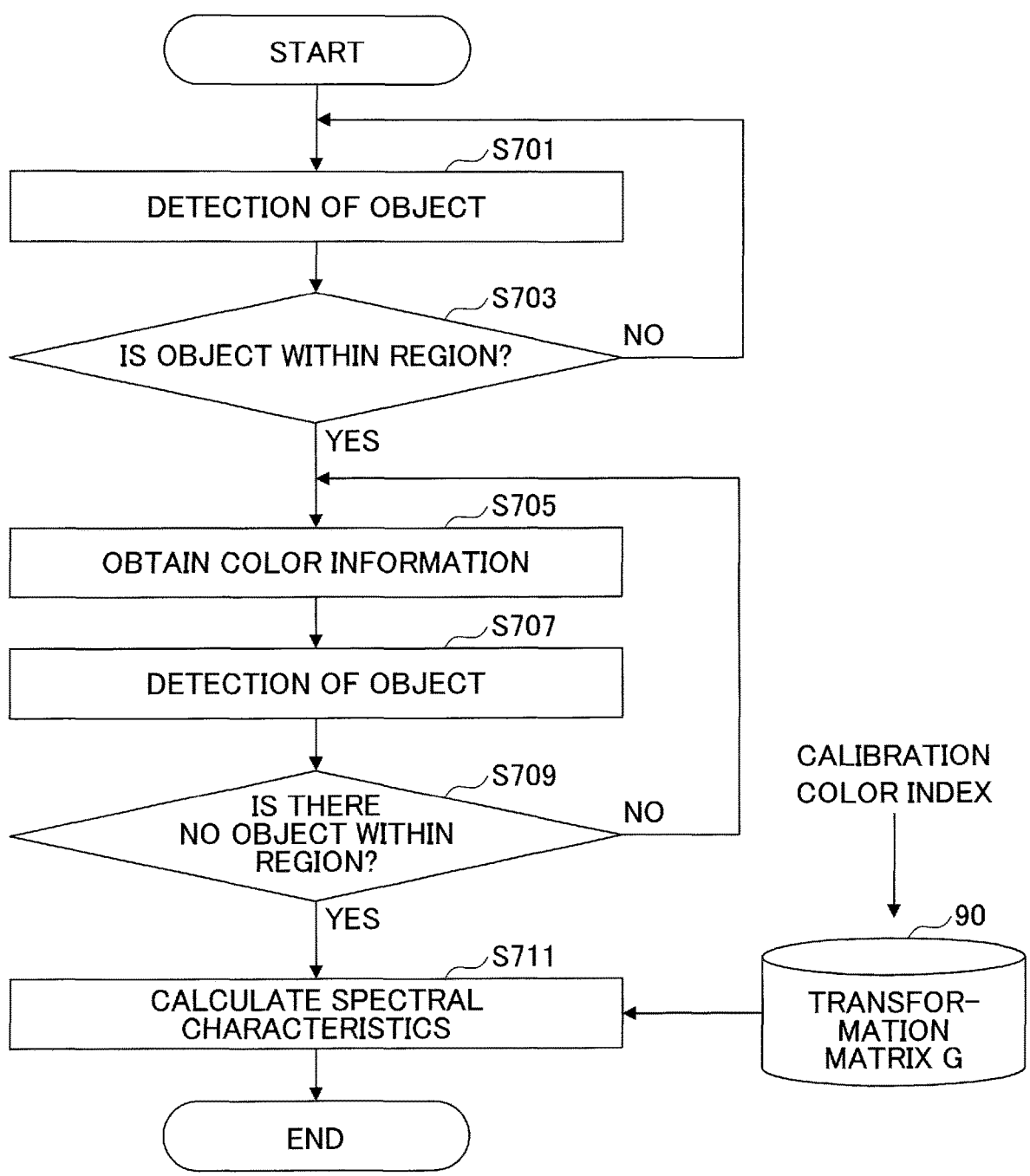
FIG. 7 is a flowchart illustrating an example of a spectral characteristics obtaining process performed by the spectral characteristic obtaining apparatus according to the first embodiment.

FIG. 7 is a flowchart illustrating an example of an overview of a spectral characteristics obtaining process performed by the spectral characteristic obtaining apparatus 10 according to the present embodiment.

In FIG. 7, first, in step S701, the object detecting sensor 101 obtains a detection signal indicating whether the object 100, which is being conveyed in the y-axis direction, has been conveyed into the color information acquiring region 100a, and outputs the detection signal to the controller 300.

Next, in step S703, the controller 300 determines whether the object 100 has been conveyed into the color information acquiring region 100a.

When it is determined that the object 100 has been conveyed into the color information acquiring region 100a in step S703, the controller 300 illuminates the linear illumination light source 20 at a predetermined timing after receiving the detection signal output from the object detecting sensor 101, in step S705. Then, the color information obtaining unit 40 starts obtaining color information data. Namely, when the conveyed object 100 reaches the color information acquiring region 100a, each spectral sensor included in the color information obtaining unit 40 receives a diffraction image obtained from reflected light of the object 100 in the color information acquiring region 100a, and outputs color information data.

At this time, a range in the y-axis direction of the object 100 where color information data is obtained is not necessarily precisely defined. A timing at which to obtain color information data after receiving a detection signal output from the object detecting sensor 101 may be defined. A range in the x-axis direction of the object 100 within which color information data is obtained is preferably longer than the length in the x-axis direction of the object 100.

When it is determined that the object 100 has not been conveyed into the color information acquiring region 100a in step S703, the controller 300 causes the process to return to step S701, and the object detecting sensor 101 continues the process for obtaining a detection signal.

Next, in step S707, the object detecting sensor 101 obtains a detection signal indicating whether the object 100 has been conveyed away from the vicinity of the color information acquiring region 100a, and outputs the detection signal to the controller 300.

Next, in step S709, the controller 300 determines whether the object 100 has been conveyed away from the color information acquiring region 100a.

When it is determined that the object 100 has been conveyed away from the color information acquiring region 100a in step S709, the spectral characteristic calculating unit 86 calculates, in step S711, spectral characteristics of the object 100 based on the obtained color information data, by using a transformation matrix G stored in the transformation matrix storage unit.

When it is determined that the object 100 has not been conveyed away from the color information acquiring region 100a, the controller 300 causes the process to return to step S705, and the color information obtaining unit 40 continues to obtain color information data.

The process ends upon the spectral characteristics being calculated.

The overview of the spectral characteristic obtaining process performed by the spectral characteristic obtaining apparatus according to the present embodiment has been described above.

Next, a transformation matrix G calibration function of the spectral characteristic obtaining apparatus 10 according to the present embodiment will be described. The calibration color index 50 and the calibration color index conveying unit 60 are used for calibration. A transformation matrix stored in the transformation matrix storage unit 90 is calibrated by using color information data obtained from the calibration color index 50 by the color information obtaining unit 40.

In a case where a transformation matrix G is calibrated by using a calibration color index, colors of the calibration color index are used as reference. Conventionally, a calibration color index having a color range that is longer than an array length of spectral sensors aligned in the x-axis direction has been used, such that a transformation matrix of the spectral sensors aligned in the x-axis direction can be calibrated by using the same color.

However, in order to obtain spectral characteristics of an object that is long in the x-axis direction, a color information obtaining unit is required to have spectral sensors that are aligned across a long range in the x-axis direction. Further, because a calibration color index is created by coloring a base material with toned paints, color irregularity, namely nonuniformity in spectral characteristics more readily occurs as a range to be colored becomes large.

Thus, it has been sometimes difficult to create a calibration color index having uniform spectral characteristics over the entire range if an array length of spectral sensors aligned in the x-axis direction is long. If the calibration color index has nonuniformity in spectral characteristics, spectral characteristics used as reference may become different for each of the spectral sensors. Thus, a matrix has sometimes failed to be accurately calibrated.

In the present embodiment, when a transformation matrix G is calibrated, the spectral sensors constituting the color information obtaining unit 40 obtain color information from the same region of the calibration color index 50. Because a difference in spectral characteristics does not occur in the same region, it becomes possible to prevent reference spectral characteristics from being different for each of the spectral sensors when calibrating a transformation matrix.

Also, in order for the spectral sensors to obtain color information from the same region of the calibration color index 50, the calibration color index conveying unit 60 allows relative positions between the spectral sensors and the calibration color index 50 in the x-axis direction to be changed. Namely, the calibration color index conveying unit 60 causes the same region of the calibration color index 50 to be located at each of the spectral sensors.

The "same region" does not necessarily mean exactly the same region. A positional difference caused by an error that is commonly considered as a margin of error, such as an error in a feed amount of the calibration color index conveying unit 60 or an error in an arrangement position of the spectral sensors, is accepted.

Conversely, in a case where the calibration color index 50 is conveyed such that all the spectral sensors obtain the same color information from the same region of the calibration color index 50, it takes time to obtain one "reference color". Thus, in the present information, the calibration color index is not composed of one color. The calibration color index 50 is configured to include a plurality of regions arranged in the x-axis direction and having different colors from each other within the color gamut of an object. Accordingly, color information on a plurality of "reference colors" can be obtained by conveying the calibration color index in the x-axis direction, thereby shortening the time required for calibration.

Figure 8:
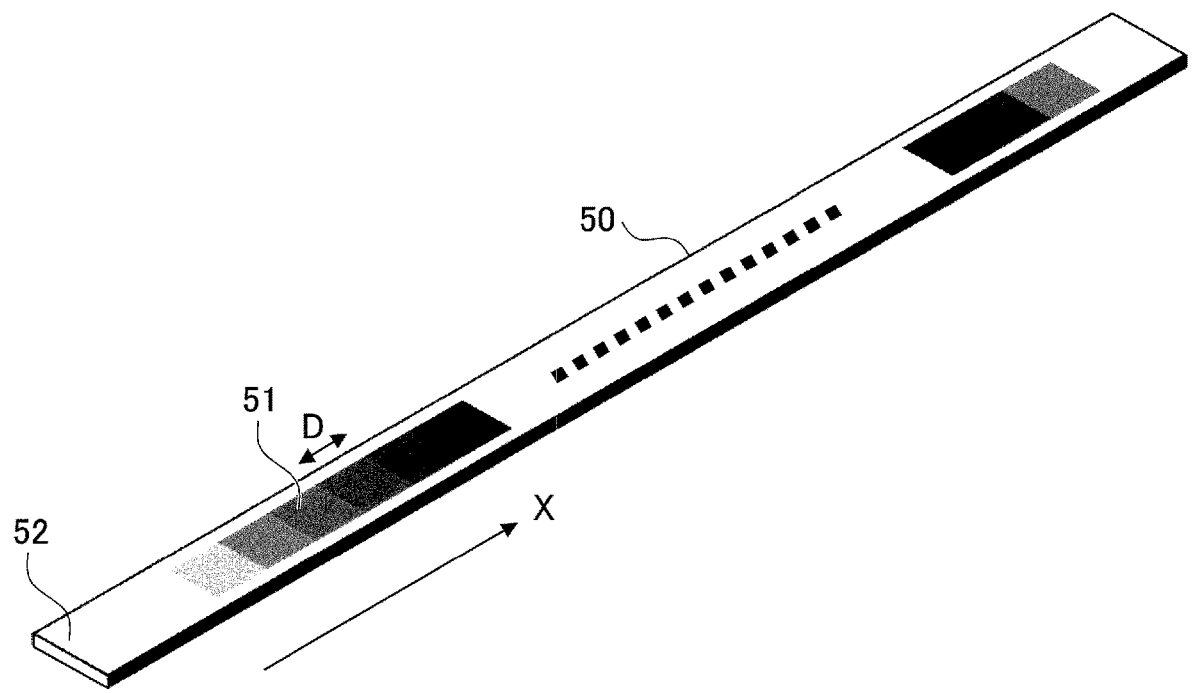
FIG. 8 is a diagram illustrating an example of a calibration color index of the spectral characteristic obtaining apparatus according to the first embodiment.

FIG. 8 is a diagram illustrating an example of the calibration color index 50. The calibration color index 50 is a plate-shaped member with the longer side being in the x-axis direction, and includes a plurality of regions of colors with known spectral characteristics. For example, a rectangular region denoted by 51 is one of the plurality of regions of colors with known spectral characteristics. As described, in the calibration color index 50 according to the present embodiment, the plurality of regions having different colors from each other within the color gamut of an object are aligned in the x-axis direction. The colors in the regions are each used as reference for calibration.

The regions of colors have the same length in the x-axis direction of the calibration color index 50, as denoted by an arrow D in FIG. 8. As the length D becomes shorter, nonuniformity in spectral characteristics in each of the regions decreases, which is preferable. However, if the length D becomes shorter than a "length corresponding to a spatial range that extends in the x-axis direction and within which color information can be obtained by each spectral sensor," two or more color information may be mixed in a spatial range within which color information can be obtained at one time. A spatial range within which color information can be obtained is a spatial range within which each spectral sensor of the color information obtaining unit 40 can obtain color information at one time in the X-Y plane, and in other words, is an imaging field of view of each spectral sensor for spectrometry.

Mixed color information from two or more regions appears as noise when a transformation matrix is calibrated. Thus, in the present embodiment, the length D is set greater than or equal to the "length corresponding to a spatial range that extends in the x-axis direction and within which color information can be obtained by each spectral sensor". Accordingly, it is possible to prevent noise from appearing when calibrating a transformation matrix.

As an example, when a pixel size in the x-axis direction of each spectral sensor is set to 10 μm, the number of pixels constituting one spectral sensor is set to 10, and imaging magnification of an optical system for spectrometry is set to 0.1 times, the "length corresponding to a spatial range that extends in the x-axis direction and within which color information can be obtained by each spectral sensor" is 1 mm. Accordingly, the length D is set to greater than or equal to 1 mm.

Next, in relation to the calibration color index 50, a feed amount at which the calibration color index 50 is moved in the x-axis direction by the calibration color index conveying unit 60 will be described. The feed amount corresponds to a spatial interval at which the spectral characteristic obtaining apparatus 10 obtains color information. The spectral characteristic obtaining apparatus 10 repeatedly moves the calibration color index 50 in the x-axis direction at a predetermined feed amount and causes each spectral sensor to obtain color information.

In the present embodiment, the feed amount is set greater than or equal to the "length corresponding to a spatial range that extends in the x-axis direction and within which color information can be obtained by each spectral sensor". As described above, as an example, when a pixel size in the x-axis direction of each spectral sensor is set to 10 µm, the number of pixels constituting one spectral sensor is set to 10, and imaging magnification of an optical system for spectrometry is set to 0.1 times, the "length corresponding to a spatial range that extends in the x-axis direction and within which color information can be obtained by each spectral sensor" is 1 mm. Accordingly, the feed amount is set to greater than or equal to 1 mm.

For example, when the length D of each region of the calibration color index 50 is set to 1 mm and the feed amount of the calibration color index conveying unit 60 is set to 1 mm, a transformation matrix of each spectral sensor can be calibrated while preventing color information from being mixed.

The length D of each region of the calibration color index 50 and the feed amount of the calibration color index conveying unit 60 are not limited to the above. The length D and the feed amount are preferably less than or equal to half the length of the array of spectral sensors aligned in the x-axis direction. In this way, the length of the calibration color index conveying unit 60 in the x-axis direction can be reduced at least by half. As a result, color irregularity, namely nonuniformity in spectral characteristics can be suppressed.

The feed amount of the calibration color index conveying unit 60 can be readily changed by changing settings of the motor driving unit 308. Thus, the feed amount may be appropriately changed when necessary.

In the above-described example, the interval at which the spectral characteristic obtaining apparatus 10 obtains color information is determined by the feed amount; however, the present embodiment is not limited thereto. For example, the interval at which the spectral characteristic obtaining apparatus 10 obtains color information may be determined by a frame rate of the imaging element and a feed speed at which the calibration color index 50 is moved in the x-axis direction. In this case, the spectral characteristic obtaining apparatus obtains the color information at a time interval determined by the frame rate of the imaging element 44, while causing the calibration color index 50 to move in the x-axis direction at a constant speed. As an example, when the frame rate of the imaging element 44 is set to 30 fps (frames per second) and color information is obtained at spatial intervals of 1 mm, the feed speed may be set to 30 mm/s.

By making a product of the frame rate of the imaging element 44 multiplied by the feed speed of the calibration color index 50 greater than or equal to the "length corresponding to a spatial range that extends in the x-axis direction and within which color information can be obtained by each spectral sensor," it becomes possible to prevent color information from being mixed when a transformation matrix is calibrated, as described above.

It is desirable for regions having different colors from each other in the calibration color index 50 to be uniformly selected from a range (gamut) of colors that can be reproduced in a color space such as the XYZ color space or the L*a*b* color space for printed images.

Similarly to the above-described case of the standard samples, it takes a lot of time and cost to create, maintain, and measure regions of colors in the calibration color index 50. Therefore, a small number of colors are often used as long as estimation accuracy for spectral characteristics can be maintained. To be more specific, several colors to several tens of colors selected from the range of colors that can be reproduced in printing are often used. However, in order to perform high-precision measurement with increased estimation accuracy for spectral characteristics, several hundred colors to several thousand colors are required. This becomes obvious when a color material containing four or more multi-colors is used for high-quality electrophotographic or inkjet printing. Multi-colors include orange, green, white, clear, and fluorescent colors, in addition to yellow, magenta, cyan, and black.

In the present embodiment, several colors to several thousand colors selected from the range of colors that can be reproduced in printing by a printing apparatus.

In FIG. 8, the calibration color index 50 includes a plate-shaped member 52 that is formed by cutting a metallic material such as aluminum, and includes a plurality of regions 51 of colors provided on the upper surface of the plate-shaped member 52. The regions 51 are formed in a strip shape and colored with toned paints. The regions 51 arranged in a stripe pattern are printed on the plate-shaped member 52. The regions 51 are not required to be directly printed on the plate-shaped member 52, and may be printed on paper and attached to the plate-shaped member 52. The plate-shaped member 52 has a size that is sufficiently large for a person not to touch the regions 51 when holding or carrying the plate-shaped member 52. When the number of color regions 51 of colors is large, a plurality of plate-shaped members is prepared.

Spectral characteristics of each of the regions of the calibration color index 50 are preliminarily measured by a high-precision spectrometer. A matrix R1 representing spectral characteristics of each of the regions are preliminarily stored in the reference data storage unit 88.

Next, a method for calibrating a transformation matrix G, which is performed by the transformation matrix calculating unit 85, will be described. Spectral sensors of the color information obtaining unit 40 have respective transformation matrices G, and the transformation matrix G of the spectral sensors is calibrated by the transformation matrix calculating unit 85. The transformation matrix calculating unit 85 is an example of a "transformation matrix calibrating unit".

When a transformation matrix G is calibrated, the calibration color index 50 is positioned in the color information acquiring region 100a, instead of the object 100. The linear illumination light source 20 irradiates the calibration color index 50 with light, and the spectral sensors of the color information obtaining unit 40 receive diffraction images and output color information data.

In the following, a process in which the m number of spectral sensors $40_m$ of the color information obtaining unit 40 each obtain color information from the n number of regions $51_n$ of the calibration color index 50 will be described.

First, the calibration color index conveying unit 60 moves a region $51_1$, which is closest to a positive x-side of the calibration color index among the regions $51_n$, to a position where a spectral sensor $40_1$, which is closest to a negative x-side of the color information obtaining unit 40 among the spectral sensors $40_m$, obtains color information data. At this initial position, the spectral sensor $40_1$ obtains color information of the region $51_1$.

Next, the calibration color index conveying unit 60 moves the calibration color index 50 in the x-axis direction by a predetermined distance, and causes a region $51_2$ adjacent to the region $51_1$ to be located at a position where the spectral sensor $40_1$ obtains color information data. At this position, the spectral sensor $40_1$ obtains color information of the region $51_2$. By repeating the above-described process at the n number of times, the spectral sensor $40_1$ obtains $V_1$ that stores color information data v. The predetermined distance is, for example, 1 mm.

When the region $51_2$ is located at the position where the spectral sensor $40_1$ obtains color information, the region $51_1$ is located at a position where a spectral sensor $40_2$ adjacent to the spectral sensor $40_1$ obtains color information. Thus, the spectral sensor $40_1$ obtains color information of the region $51_2$ simultaneously when the spectral sensor $40_2$ obtains color information of the region $51_1$. By repeating this process at the n number of times, it is possible for the spectral sensor $40_1$ to obtain a matrix $V_1$ and for the spectral sensor $40_2$ to obtain a matrix $V_2$ in the same process. The same applies to the other spectral sensors $40_3$ through $40_m$.

Figure 9:
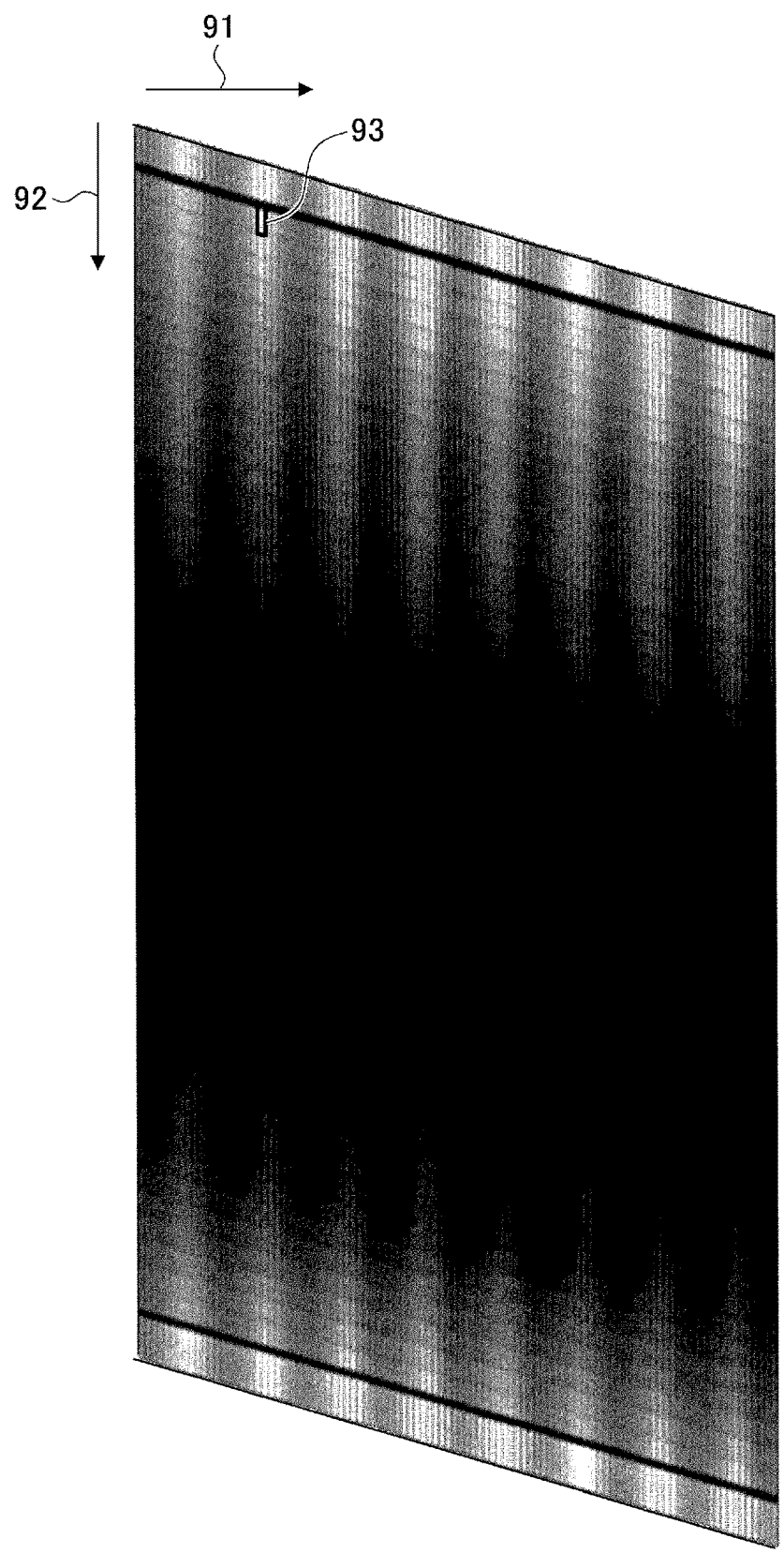
FIG. 9 is an example of color information data obtained from the calibration color index by the spectral characteristic obtaining apparatus according to the first embodiment.

FIG. 9 illustrates an example of color information obtained from the regions $51_n$ by the spectral sensors $40_m$. In FIG. 9, an arrow 91 indicates a direction in which the spectral sensors $40_m$ are arranged, and an arrow 92 indicates a direction in which the regions $51_n$ are arranged. Also, a cell 93 indicates color information data obtained from one region by one spectral sensor. When color information data is obtained, the calibration color index 50 is moved by 1 mm increments in the x-axis direction, namely in the direction of the arrow 92 in this example. Thus, the color information data of each of the spectral sensors indicates the regions as being shifted by 1 mm increments in the direction of the arrow 92.

In FIG. 9, a data array is corrected such that the shift in the direction indicated by the arrow 92 is eliminated, namely the shape of the data array is changed from a parallelogram shape to a rectangular shape. Also, the color information data is displayed by associating the spectral sensors with each of the regions of colors. As a result, a table illustrated in FIG. 10 can be obtained. For example, the data array can be corrected by applying image processing to the image of FIG. 9.

In FIG. 10, a header column indicates the spectral sensors $40_m$ and a header row indicates regions $52_n$. Each column corresponds to a matrix $V_m$ that stores color information data of each of the spectral sensors.

The transformation matrix calculating unit 85 first obtains, from the reference data storage unit 88, a matrix $R_{ref}$ that represents preliminarily measured spectral characteristics of the standard samples and a matrix $R_1$ that represents a spectral characteristic of each region of the calibration color index 50, and adds the matrix $R_1$ to the matrix $R_{ref}$ to obtain a matrix $R_{rev}$. Furthermore, a matrix $V_m$ of color information data that is obtained from the calibration color index 50 is added to a matrix $V_{mref}$ of color information data that is obtained from the standard samples stored in the color information data storage unit 89, such that a matrix $V_{mrev}$ is obtained.

By using the matrices $R_{rev}$ and $V_{mref}$ obtained in this way, the transformation matrix calculating unit 85 obtains a transformation matrix $G_m$ in accordance with the formula (5), and stores such a calibrated transformation matrix $G_m$ in the transformation matrix storage unit 90. By using the calibrated transformation matrix $G_m$ for the spectral sensors $40_m$, the spectral characteristic calculating unit 86 can estimate spectral characteristics of the object 100 with high accuracy.

Figure 11:
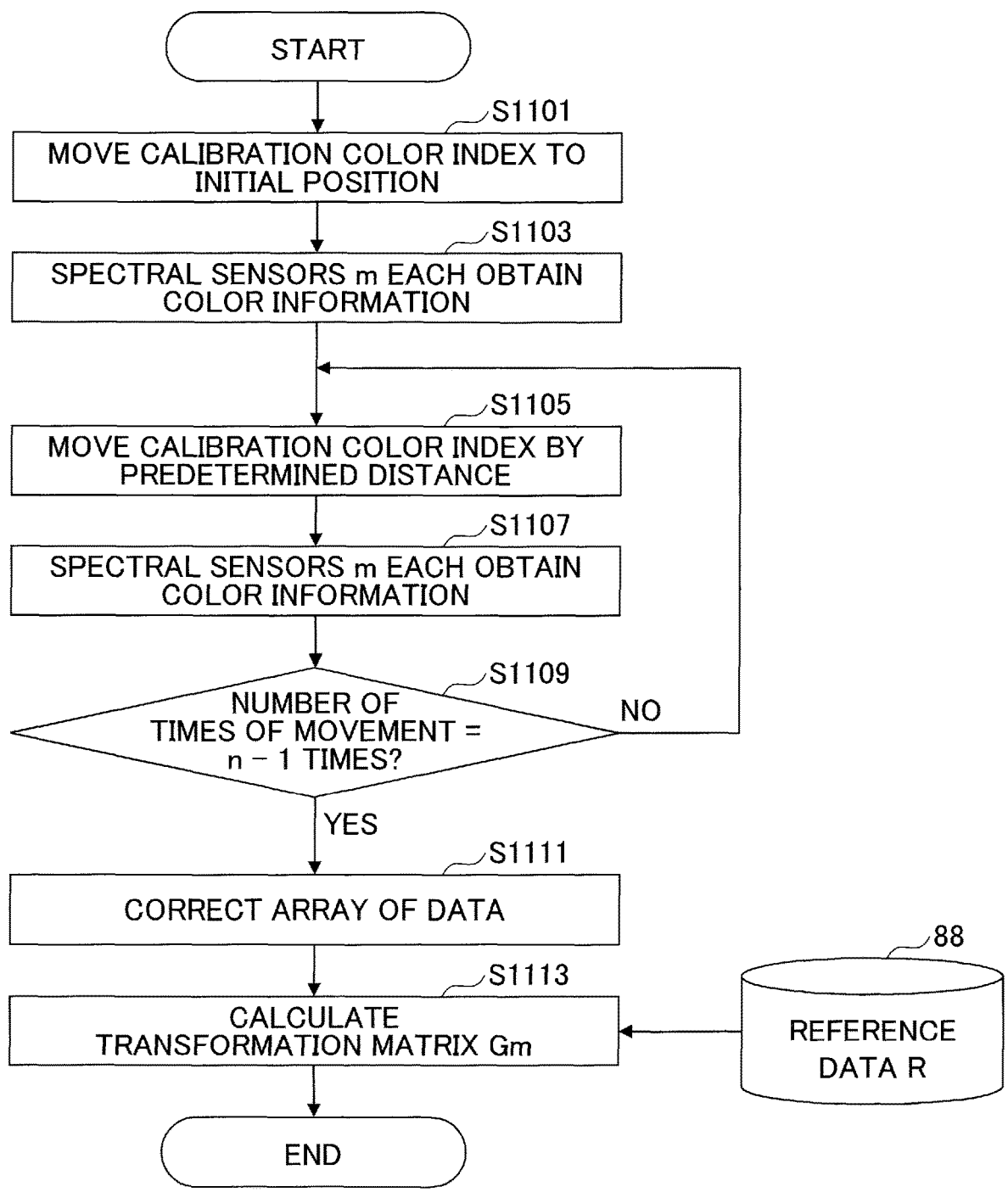
FIG. 11 is a flowchart illustrating an example of a process for calibrating a transformation matrix by the spectral characteristic obtaining apparatus according to the first embodiment.

FIG. 11 is a flowchart illustrating an example of a process for calibrating a transformation matrix G as described above.

First, in step S1101, the calibration color index conveying unit 60 moves a region $51_1$, which is closest to the positive x-side of the calibration color index 50 among regions $51_n$, to a position where a spectral sensor $40_1$, which is closest to the negative x-side of the color information obtaining unit 40 among spectral sensors $40_m$, obtains color information data. Namely, the calibration color index conveying unit 60 moves the calibration color index 50 to the initial position.

Next, in step S1103, the spectral sensors $40_m$ each obtain color information of a corresponding region of the regions $51_n$.

Next, in step S1105, the calibration color index conveying unit 60 moves the calibration color index 50 by a predetermined distance in the x-axis direction.

Next, in step S1107, the spectral sensors $40_m$ each obtain color information of a corresponding region of the regions $51_n$.

Next, in step S1109, the controller 300 determines whether the calibration color index 50 has been moved n−1 times.

When it is determined that the calibration color index 50 has not been moved n−1 times in step S1109, the controller 300 causes the process to return to step S1105, and the calibration color index conveying unit 60 moves the calibration color index 50 by the predetermined distance in the x-axis direction.

When it is determined that the calibration color index 50 has been moved n−1 times in step S1109, the data array correcting unit 84 corrects an array of the obtained color information data and obtains a matrix $V_m$.

Next, in step S1113, the transformation matrix calculating unit 85 calculates a transformation matrix $G_m$ by referring to the obtained matrix $V_m$ and the matrix $R_1$ stored in the reference data storage unit 88.

As described above, the spectral characteristic obtaining apparatus 10 according to the present embodiment can reduce nonuniformity in spectral characteristics of the calibration color index 50 and accurately calibrate a transformation matrix G even if the length of the array of spectral sensors 40m becomes long depending on the object 100. Also, by using the transformation matrix G calibrated in the above-described manner, it becomes possible to reduce differences in spectral characteristics between the spectral sensors 40m, and thus obtain spectral characteristic with high accuracy.

In the present embodiment, plural regions having different colors from each other within the color gamut of an object are arranged in the x-axis direction. Thus, a plurality of pieces of "reference color" information can be obtained while conveying the calibration color index 50 in the x-axis direction, thereby reducing the time required for calibration.

The length D of each of the regions is set greater than or equal to the "length corresponding to spatial resolution in the x-axis direction with which color information can be obtained by each spectral sensor". Accordingly, each of the spectral sensors can obtain color information from a smallest possible region of the calibration color index 50, and a transformation matrix can be accurately calibrated.

The feed amount at which the calibration color index conveying unit 60 moves the calibration color index 50 in the x-axis direction is set greater than or equal to the "length corresponding to spatial resolution in the x-axis direction with which color information can be obtained by each spectral sensor". Accordingly, calibration can be performed by using the smallest region within which each of the spectral sensors can obtain color information.

Further, in the spectral characteristic obtaining apparatus 10 according to the present embodiment, a high-speed operation is enabled by the imaging element 44 having pixels arrayed in a line. Thus, spectral characteristics of the object 100 can be obtained at high speed or at once. For example, the spectral characteristic obtaining apparatus 10 can be applied to a field requiring a high-speed measurement such as an in-line measurement for a printed image. Moreover, in the spectral characteristic obtaining apparatus 10 according to the present embodiment, spectral characteristics of the entire surface of the object 100 can be obtained. Thus, it is possible to obtain not only spectral characteristics of a color chart having predetermined colors printed at predetermined locations, but also spectral characteristics of a recording medium having any image printed. Therefore, it is particularly effective when colors are strictly managed and adjusted.

Second Embodiment

Next, an example of a spectral characteristic obtaining apparatus according to a second embodiment will be described with reference to FIGS. 12 through 14. A description of elements having the same configurations as those of the first embodiment may be omitted.

Figure 12:
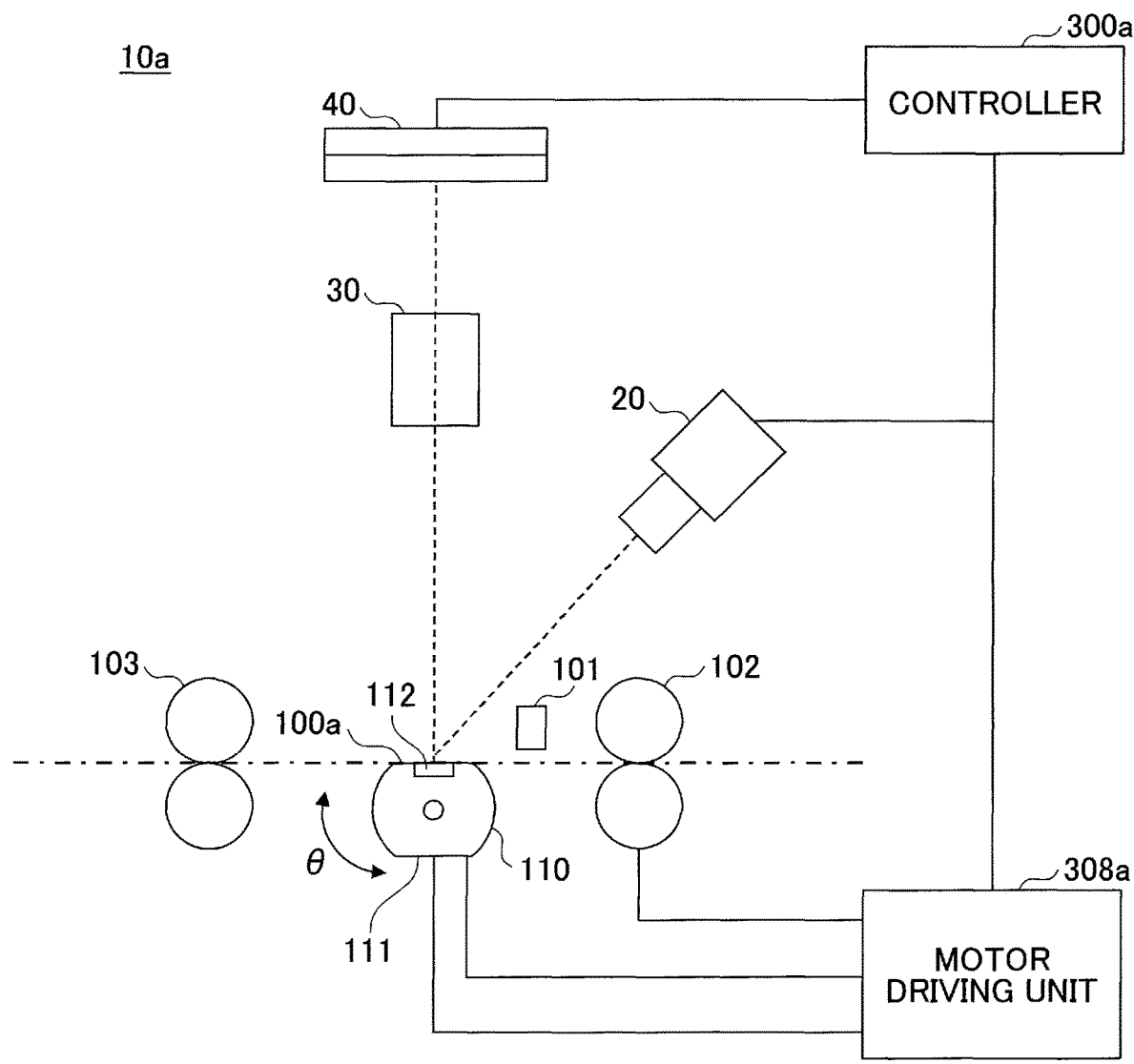
FIG. 12 is a schematic view illustrating a configuration of a spectral characteristic obtaining apparatus according to a second embodiment.

FIG. 12 is a schematic view illustrating a configuration of a spectral characteristic obtaining apparatus 10a according to the present embodiment.

The spectral characteristic obtaining apparatus 10a includes an operation mode switching unit 110. The operation mode switching unit 110 includes an object contact surface 111 and a guide portion 112. The operation mode switching unit 110 is a member that can rotate in a θ direction around a rotating axis that is parallel to the x-axis. The guide portion 112 holds the calibration color index 50 and guides movement of the calibration color index in the x-axis direction. The operation mode switching unit 110 is an example of an "operation mode switching unit," and also an example of a "columnar-shaped member with the longer side being in the array direction".

The operation mode switching unit 110 rotates so as to switch the side facing the reduction imaging lens 30 between the object contact surface 111 and the calibration color index 50 held by the guide portion 112. In this way, operation modes of the spectral characteristic obtaining apparatus 10a can be switched between a spectral characteristic obtaining mode and a calibration mode.

The operation mode switching unit 110 is coupled to a motor driving unit 308a, and is driven by a signal output from the motor driving unit 308a. The motor driving unit 308a is an electric circuit that outputs a drive signal, including a drive voltage, to a motor for actuating the operation mode switching unit 110, in accordance with a control signal input from the controller 300a.

Two pairs of rollers 102 and 103 are conveyance rollers for sandwiching an object 100 and conveying the object 100 in the y-axis direction.

Figure 13A:
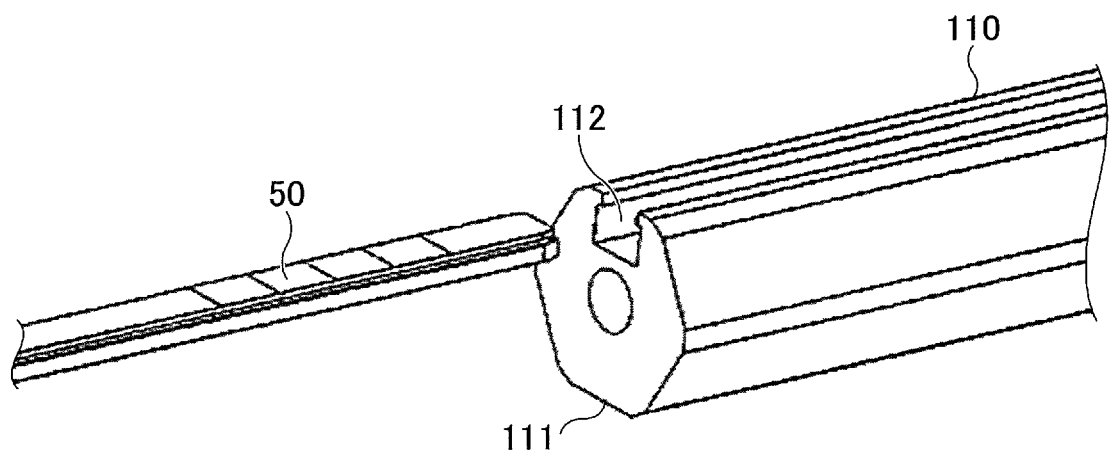
FIGS. 13A through 13C are views illustrating an exemplary configuration of an operation mode switching unit of the spectral characteristic obtaining apparatus according to the second embodiment.
Figure 13B:
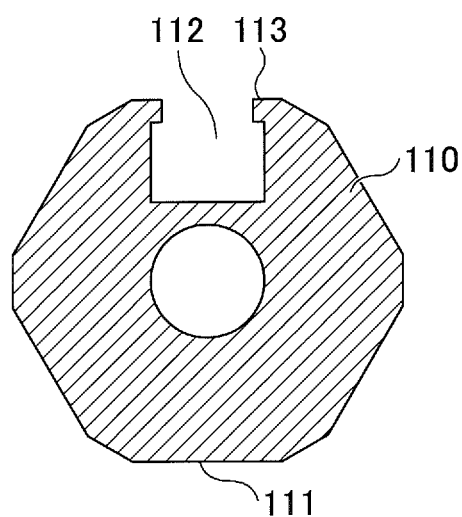
Figure 13C:
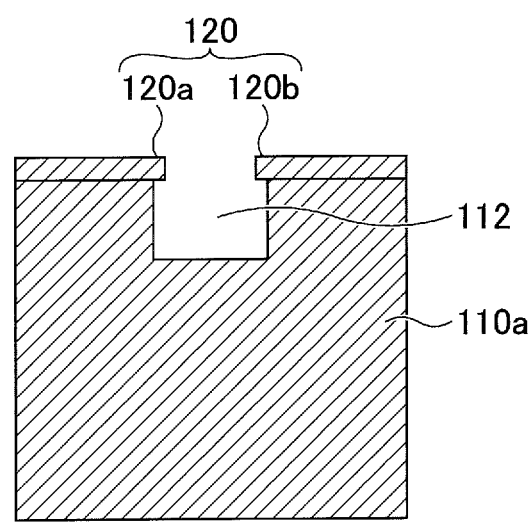

FIGS. 13A through 13C are enlarged views of the operation mode switching unit 110. FIG. 13A is a perspective view, FIG. 13B is a view illustrating an exemplary cross section of the operation mode switching unit 110 taken along a plane perpendicular to the x-axis, and FIG. 13C is a view illustrating another exemplary cross section of the operation mode switching unit 110 taken along a plane perpendicular to the x-axis.

As illustrated in FIG. 13A, the operation mode switching unit 110 is a six-sided columnar-shaped member with the longer side being in the x-axis direction. One of the sides has a guide groove that is formed into a U shape in cross section vertical to the x-axis. The calibration color index 50 is inserted into the guide groove of the guide portion 112, and follows the guide groove so as to be conveyed in the x-axis direction. Also, as illustrated in FIG. 13B, a restricting portion 113 is provided near the guide portion 112, such that the calibration color index 50 does not come out of the guide groove when the calibration color index 50 is conveyed in the x-axis direction.

For example, the operation mode switching unit 110 can be produced by cutting a six-sided columnar-shaped member. Alternatively, a resin may be used as a material of the operation mode switching unit 110, and the operation mode switching unit 110 may be formed of a resin by using a mold.

A calibration color index detecting sensor for detecting whether the calibration color index 50 has been inserted into the guide groove is provided at the bottom of the guide groove and also near an inlet of the guide groove into which the calibration color index 50 is inserted. The calibration color index detecting sensor irradiates the calibration color index 50 with light and detects reflected light with a photodiode, for example. In this way, the calibration color index detecting sensor detects the presence or absence of the calibration color index 50.

The object contact surface 111 is provided on a surface on the opposite side of the guide portion 112. The object contact surface 111 is a flat rectangular surface with the longer side being in the x-axis direction.

In the spectral characteristic obtaining mode, the operation mode switching unit 110 locates the object contact surface 111 on the side facing the reduction imaging lens 30. By conveying the object 100 while being in contact with the object contact surface 111, the object 100 can be prevented from flopping when conveyed. In this state, the color information obtaining unit 40 obtains color information of the object 100.

In the calibration mode, the operation mode switching unit 110 locates the guide portion 112 on the side facing the reduction imaging lens 30. The guide portion 112 holds the calibration color index 50 inserted into the guide groove. In this state, the color information obtaining unit 40 obtains color information of the calibration color index 50.

In the above-described operation mode switching unit 110, the six-sided columnar-shaped member serves as a main body, and the restricting portion 113 is integrally formed with the six-sided columnar-shaped member. However, the present embodiment is not limited thereto. For example, an operation mode switching unit 110a having a square column shape as illustrated in FIG. 13C may be used. Also, the restricting portion 113 may be formed separately from the main body, and may be attached to the square columnar-shaped main body. Namely, as illustrated in FIG. 13C, a restricting portion 120 may have a configuration in which two plate-shaped members 120a and 120b with the longer sides being in the x-axis direction are attached to the square columnar-shaped member such that the opening of the guide portion 112 is partly covered. With this configuration, the restricting portion 120 can be easily formed at a low cost, allowing the operation mode switching unit to be produced in an easier way at a lower cost than when produced by cutting or molding.

The restricting portion 113 and 120 are examples of a "restricting portion configured to restrict movement of a calibration color index in a conveyance direction that is orthogonal to an array direction and in a direction that is orthogonal to a plane including the array direction."

Figure 14:
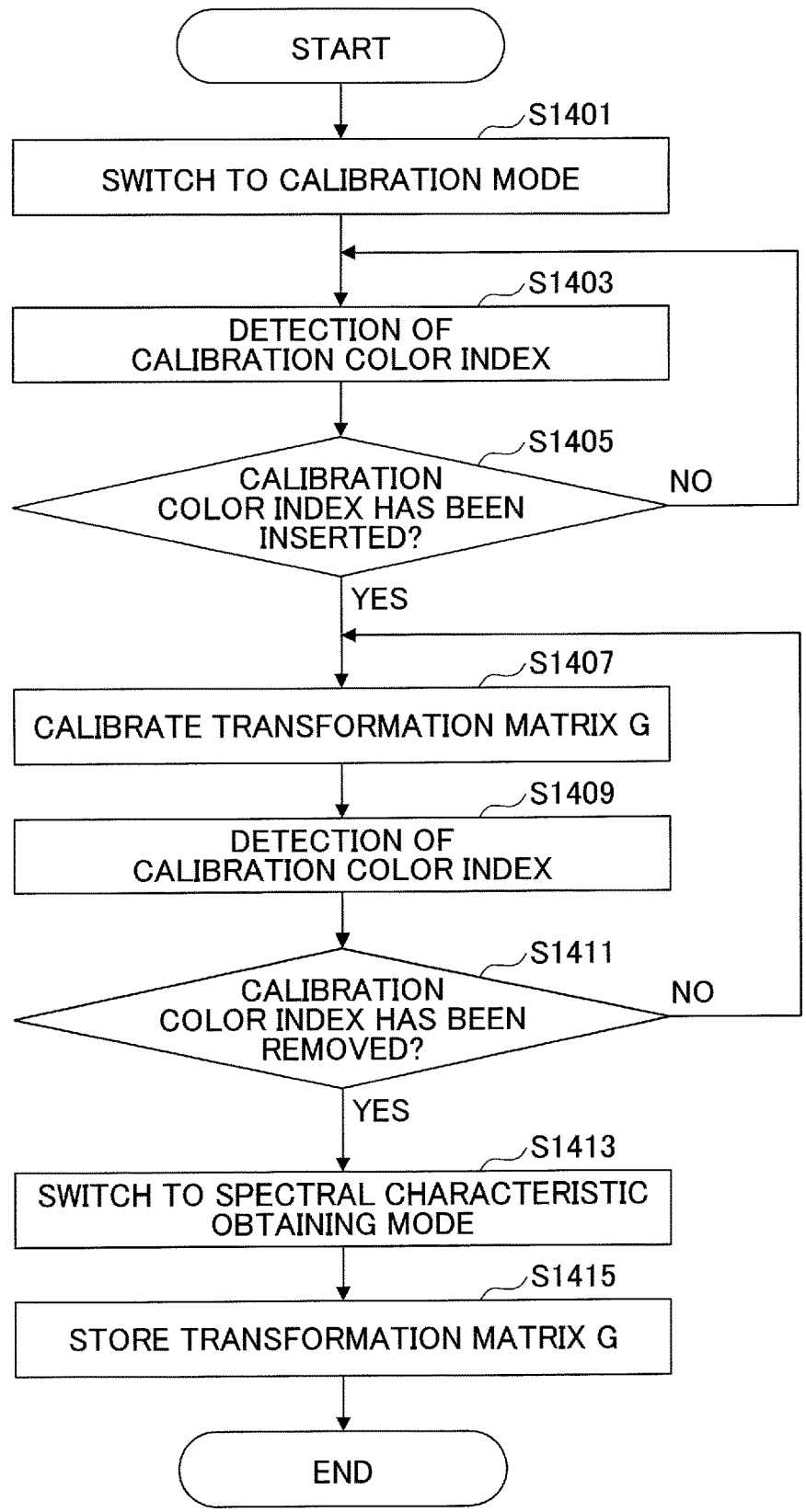
FIG. 14 is a flowchart illustrating a process for calibrating a transformation matrix by the spectral characteristic obtaining apparatus according to the second embodiment.

Next, FIG. 14 is a flowchart illustrating a calibration process performed by the spectral characteristic obtaining apparatus 10a according to the present embodiment.

First, in step S1401, in accordance with an instruction from the controller 300a to switch to the calibration mode, the operation mode switching unit 110 locates the guide portion 112 on the side facing the reduction imaging lens 30 and switches to the calibration mode.

Next, in step S1403, the calibration color index detecting sensor obtains a detection signal indicating whether the calibration color index 50 has been inserted into the guide portion 112, and outputs the detection signal to the controller 300a.

Next, in step S1405, the controller 300a determines whether the calibration color index 50 has been inserted into the guide portion 112.

When it is determined that the calibration color index 50 has been inserted into the guide portion 112 in step S1405, the controller 300a performs the process for calibrating a transformation matrix G illustrated in FIG. 11 in step S1407.

When it is determined that the calibration color index 50 has not been inserted into the guide portion 112 in step S1405, the controller 300a causes the process to return to step S1403, and the calibration color index detecting sensor continues to obtain a detection signal indicating whether the calibration color index 50 has been inserted into the guide portion 112.

Next, in step S1409, the calibration color index detecting sensor outputs a detection signal indicating whether the calibration color index 50 has been removed from the guide portion 112 to the controller 300a.

Next, in step S1411, the controller 300a determines whether the calibration color index 50 has been removed from the guide portion 112.

When it is determined that the calibration color index 50 has been removed from the guide portion 112 in step S1411, the operation mode switching unit 110 locates the object contact surface 111 on the side facing the reduction imaging lens 30 and switches to the spectral characteristic obtaining mode in step S1413.

Next, in step S1415, the transformation matrix storage unit 90 stores the transformation matrix G.

When it is determined that the calibration color index 50 has not been removed from the guide portion 112 in step S1411, the controller 300a causes the process to return to step S1407 and continues to perform the process for calibrating a transformation matrix G illustrated in FIG. 11.

As described above, in the spectral characteristic obtaining apparatus 10a according to the present embodiment, the operation mode switching unit 110 is provided such that the spectral characteristic obtaining mode and the calibration mode can be easily switched. Accordingly, a transformation matrix G can be calibrated at any timing in accordance with an ambient temperature of the spectral characteristic obtaining apparatus or in accordance with a change in wavelength characteristics of a light source. Thus, spectral characteristics can be obtained with high accuracy.

Also, the configuration according to the present embodiment can prevent an error related to operations of spectral characteristics being obtained and calibration being performed at the same time, by using a machine-based method or a software-based method.

Other effects are similar to those described in the first embodiment.

Third Embodiment

Next, an example of a spectral characteristic obtaining apparatus according to a third embodiment will be described with reference to FIGS. 15 and 16. A description of elements having the same configurations as those of the first and second embodiments may be omitted.

In the spectral characteristic obtaining apparatus, characteristics of the linear illumination light source 20 may be changed due to an environmental change such as a temperature change or due to degradation over time. As a result, even if color information is obtained from the same object 100 by the color information obtaining unit 40, the obtained color information may become different from time to time.

In light of the above, a correction coefficient calculating unit of a spectral characteristic obtaining apparatus 10b according to the present embodiment calculates a correction coefficient for color information by using a white reference part and a black reference part included in the operation mode switching unit 110. The spectral characteristic calculating unit 86 estimates spectral characteristics by using color information multiplied by a correction coefficient obtained by the correction coefficient calculating unit. Thus, it becomes possible to estimate spectral characteristics with high accuracy at all times, regardless of changes in the linear illumination light source 20.

Backing colors are specified according to the purpose. For example, a black backing is used to perform calibration in accordance with ISO standards, and a white backing is used to create color profiles for printing. A backing is a material with a color used for measurements. The white reference part is used as a white backing, and a black reference part is used as a back backing.

Figure 15:
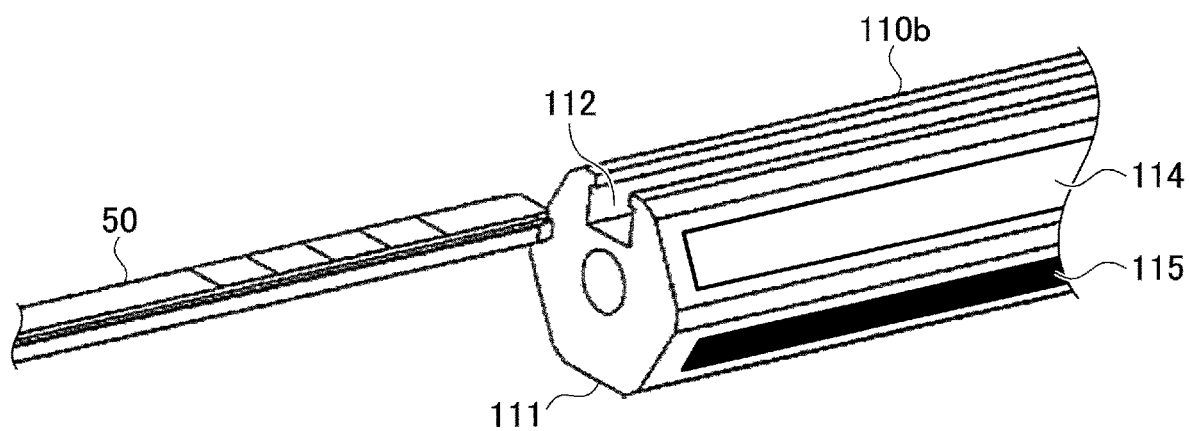
FIG. 15 is a view illustrating an example of a configuration of an operation mode switching unit according to a third embodiment.

FIG. 15 is a perspective view illustrating an example of a configuration of an operation mode switching unit 110b according to the present embodiment.

As illustrated in FIG. 15, the operation mode switching unit 110b is a six-sided columnar-shaped member having a white reference part 114 on one surface and a black reference part 115 on another surface.

The white reference part 114 is, for example, a white film, a white paper sheet for printing, or the like. The black reference part 115 is, for example, a black film, a black paper sheet for printing, or the like. The white reference part 114 and the black reference part 115 do not have color regions divided in the x-axis direction as in the calibration color index 50. The white reference part 114 has one entirely white region and the black reference part 115 has one entirely black region in the x-axis direction.

Reference color information data $V_{wref}$ and $V_{bref}$ that are obtained from the white reference part 114 and the black reference part 115 are preliminarily measured and stored in the color information data storage unit 89 as reference values.

Figure 16:
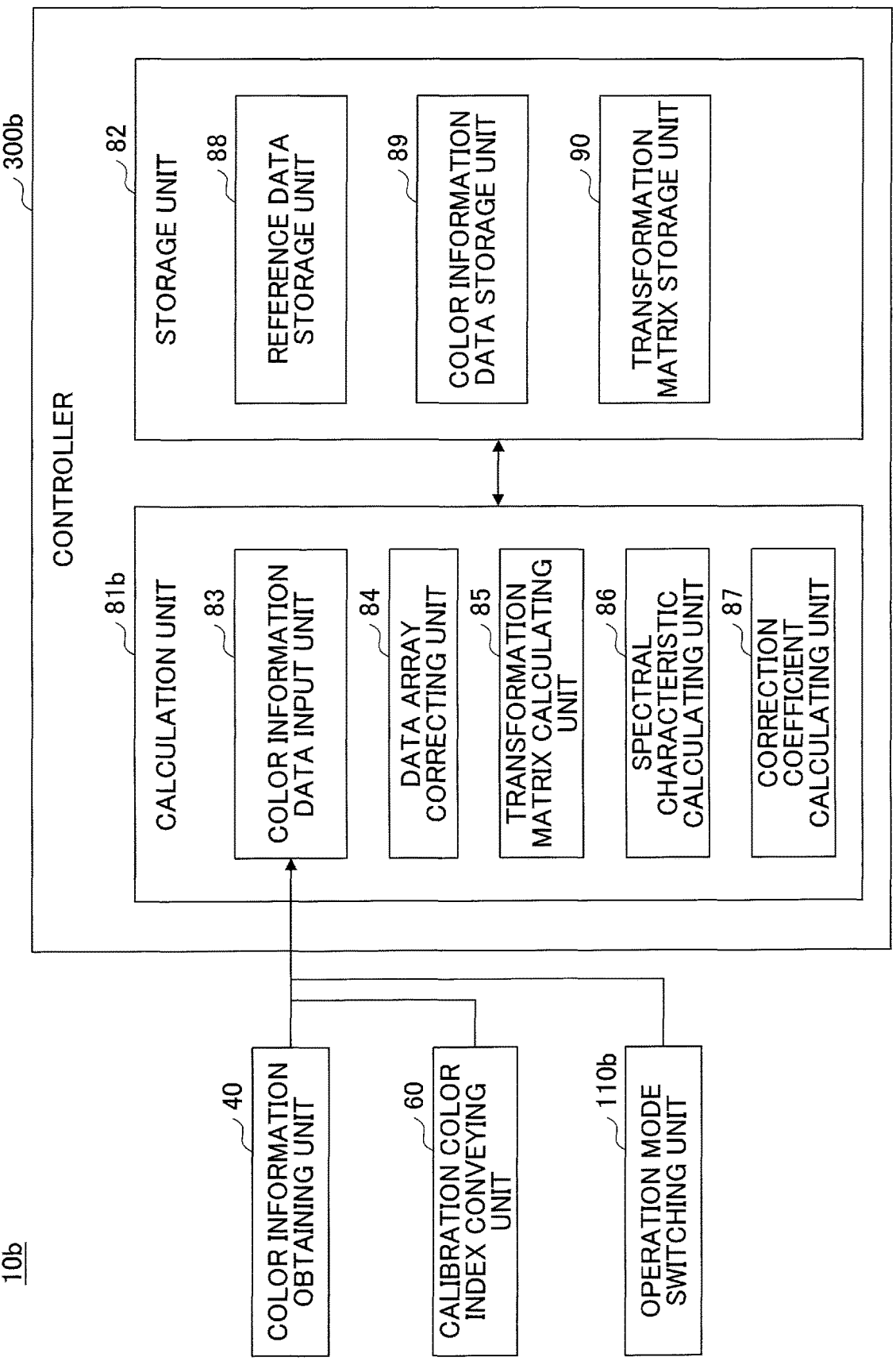
FIG. 16 is a block diagram illustrating an example of a functional configuration of a spectral characteristic obtaining apparatus according to the third embodiment.

FIG. 16 illustrates an example of a functional configuration of the spectral characteristic obtaining apparatus 10b according to the present embodiment. A calculation unit 81b of a controller 300b includes a correction coefficient calculating unit 87. Also, in order to switch between a spectral characteristic obtaining mode, a calibration mode, a white correction mode, and a black correction mode, the spectral characteristic obtaining apparatus 10b includes the operation mode switching unit 110b having the configuration described in FIG. 15.

The correction coefficient calculating unit 87 obtains color information $v_w$ and $v_b$ from the white reference part 114 and the black reference part 115. Then, the correction coefficient calculating unit 87 obtains reference color information data $v_{wref}$ and $v_{bref}$ from the color information data storage unit 89, and calculates a correction coefficient w by using the following formulas (6) and (7):

$$wi = v_{wref} \cdot i / v_w \cdot i \, (i=1, 2, \ldots N) \quad (6)$$

$$bi = v_{bref} \cdot i / v_b \cdot i \, (i=1, 2, \ldots N) \quad (7)$$

When spectral characteristics of the object 100 are estimated, the spectral characteristic calculating unit 86 obtains color information v of the object 100 and calculates corrected color information v' by using the following formulas (8) and (9).

$$v_w' = w \cdot v \quad (8)$$

$$v_b' = b \cdot v \quad (9)$$

In the case of the white backing, the spectral characteristic calculating unit 86 produces a matrix $V_{exp}$ from the color information $v_w'$ corrected by using the formula (8), and estimates spectral characteristics $R_{exp}$ of the object 100 by using a transformation matrix $G_m$ stored in the transformation matrix storage unit 90 in accordance with formula (1).

In the case of the black backing, the spectral characteristic calculating unit 86 produces a matrix $V_{exp}$ from the color information $v_b'$ corrected by using the formula (9), and estimates spectral characteristics $R_{exp}$ of the object 100 by using a transformation matrix $G_m$ stored in the transformation matrix storage unit 90 in accordance with formula (1).

In this way, the correction coefficient calculating unit 87 of the spectral characteristic obtaining apparatus 10b calculates a correction coefficient for color information data by using the white reference part 114 and the black reference part 115 included in the operation mode switching unit 110b. The spectral characteristic calculating unit 86 calculates spectral characteristics of the object 10 from the color information data corrected by using the correction coefficient. Accordingly, it is possible to estimate spectral characteristics with high accuracy at all times, regardless of an environmental change or the like.

The white reference part 114 is an example of a "white color index," and the black reference part 115 is an example a "black color index". Also, the correction coefficient calculating unit 87 is an example of a "correction coefficient calculating unit".

As described above, in the spectral characteristic obtaining apparatus 10b according to the present embodiment, color information data output from the color information obtaining unit 40 is corrected. Thus, it becomes possible to prevent estimation accuracy for spectral characteristics from decreasing due to changes in the linear illumination light source 20, while estimating spectral characteristics with high accuracy at all times.

Further, there is also an effect that allows changes in a relatively short period of time to be corrected without a complicated operation.

Other effects are similar to those described in the first and second embodiments.

Fourth Embodiment

Figure 17:
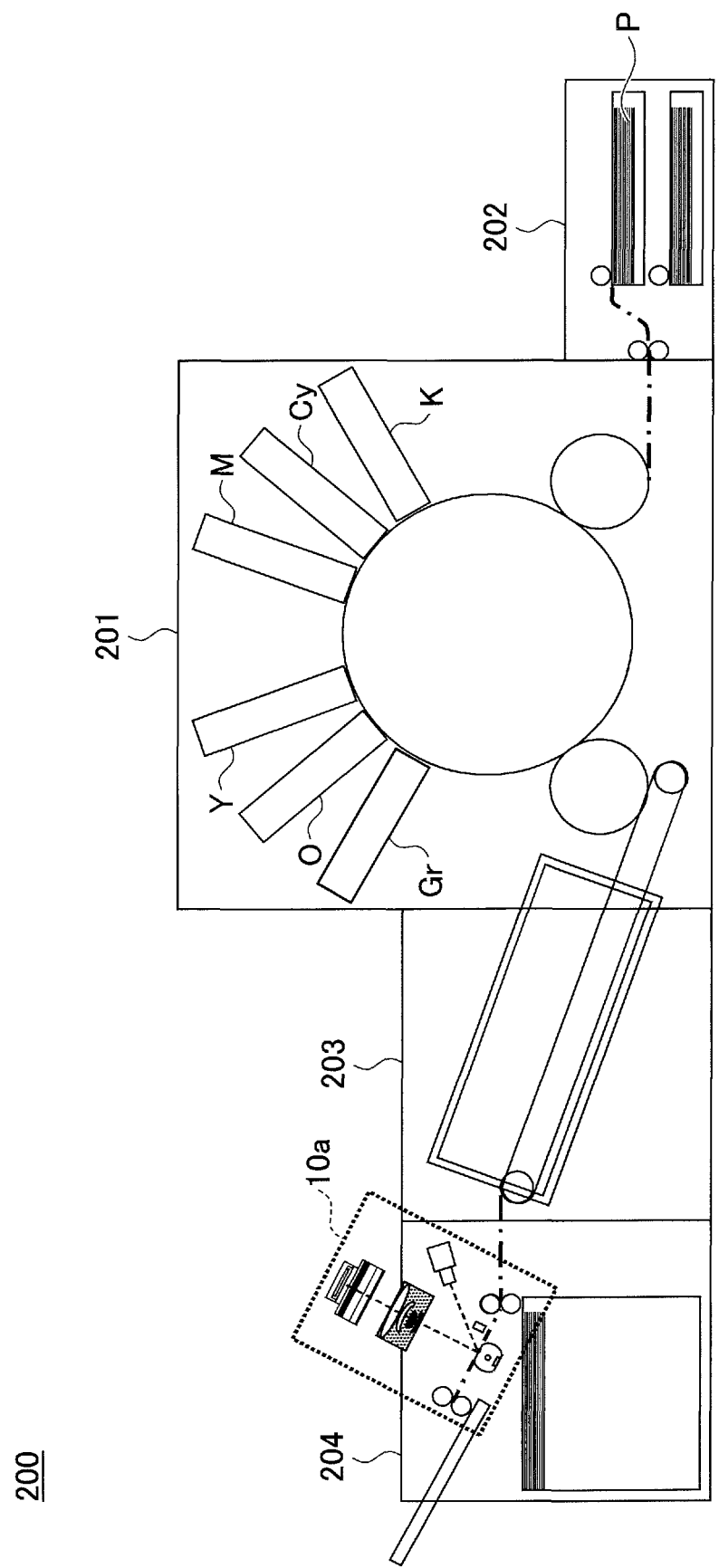
FIG. 17 is a diagram illustrating an example of a configuration of an image forming apparatus including any one of the spectral characteristic obtaining apparatuses according to the first through third embodiments.

Next, referring to FIG. 17, an example will be described in which spectral characteristics are obtained in an in-line manner by an image forming apparatus to which any one of the spectral characteristic obtaining apparatuses according to the first through third embodiments is applied. A description of elements having the same configurations as those of the above-described first through third embodiments may be omitted.

In an imaging unit 201 of the image forming apparatus 200, inkjet heads Gr, O, Y, M, Cy, and K are arranged. Reference numerals Gr, O, Y, M, Cy, and K denote ink colors of green, orange, yellow, magenta, cyan, and black, respectively.

The image forming apparatus 200 includes a paper feeding unit 202 that stores paper sheets P as objects. The paper sheets P are supplied sequentially from the top, and conveyed to the imaging unit 201 at a desired timing with a pair of registration rollers.

In the imaging unit 201, inks are each applied to a paper sheet P from an inkjet head of a corresponding color based on image information, such that a visible image is formed. After the inks are applied, the paper sheet P is supplied to a dryer 203. In the dryer 203, the inks are dried while the paper sheet P is conveyed. After the paper sheet P is dried, the paper sheet P is ejected from a paper ejector 204 or is stored in a stacker.

In the paper ejector 204, the spectral characteristic obtaining apparatus 10 is disposed so as to face an image surface of the paper sheet P. The image surface of the paper sheet P is an example of a "surface of an image bearer". The spectral characteristic obtaining apparatus 10 is used for a regular inspection performed when the image forming apparatus 200 is started, when the paper type is changed, or when the image forming apparatus 200 is operated for a long period of time. The spectral characteristic obtaining apparatus 10 obtains spectral characteristics of image data of the paper sheet P while the paper sheet P is being ejected, and monitors color irregularity and color changes in the surface of the paper sheet P.

Data obtained by the spectral characteristic obtaining apparatus 10 is transmitted to a controller of the image forming apparatus 200. The image forming apparatus 200 functions as an image evaluating apparatus, and with the aim of improving color reproducibility, adjusts image forming conditions such as an amount of ink applied from an inkjet head based on an evaluation result.

In the above-described example, the spectral characteristic obtaining apparatus 10a according to the second embodiment is applied; however, the spectral characteristic obtaining apparatuses 10 and 10b according to the first and third embodiments may be applied.

In the market, there are many image forming products such as printers, copiers, multifunction peripherals that are high value-added products having communication functions with such printers and copiers, and commercial printing machines. Also, there are a variety of image forming methods such as an electrophotographic method, an inkjet method, and a thermal method.

In a field of production printing, both sheet-feed machines and continuous-feed machines have been digitalized. Accordingly, products using the electrophotographic method and the inkjet method have been brought into the market.

Further, users' needs have increased for multidimensional, high-precision, and high-density images, with the trend of switching from monochrome printing to color printing. Accordingly, services delivered to consumers have become versatile. For example, there have been various advertisements catering to personal needs such as high quality photograph printing, catalog printing, and bill printing. Thus, there have been an increased demand for high quality images, assurance of personal information, and color reproduction.

As a known technique for improving the quality of images, an electrophotographic image forming apparatus is provided with a density sensor for detecting the density of unfixed toner on an intermediate transfer body or a photoconductive body, so as to stabilize the amount of toner supply.

As a known technique for assuring personal information, an output image is photographed with a camera, and personal information is detected by character recognition or variance detection based on a difference between plural images, without depending on the image forming method.

As a known technique for color reproduction, a color patch is output, colors are measured at one or more points by a spectrometer, and calibration is performed.

These techniques are preferably performed over the entire image area in order to accommodate image variations between different pages or within the same page.

Although the spectral characteristic obtaining apparatuses, the image forming apparatus, and the image forming system according to the embodiments have been described above, the present invention is not limited to the above-described embodiments, and variations and modifications may be made without departing from the scope of the present invention.

What is claimed is:

1. A spectral characteristic obtaining apparatus comprising:
    a plurality of spectral sensors aligned in an array direction, the plurality of spectral sensors being configured to receive light reflected from an object so as to obtain first color information of the object;
    a calibration color index configured to include a plurality of regions having different colors from each other, wherein
        the plurality of regions are arranged in the array direction, and
        at least one region of the plurality of regions is of a color having a known spectral characteristic;
    a processor; and
    a memory storing program instructions that cause the processor to
        estimate a spectral characteristic of the object based on the obtained first color information using a preset transformation matrix;
        calibrate the preset transformation matrix using second color information obtained from the calibration color index, wherein
    the plurality of spectral sensors are configured to obtain the second color information from the same region of the calibration color index, while relative positions of the plurality of spectral sensors with respect to the calibration color index in the array direction are changed at a time of calibration, and
    each region of the plurality of regions has a length in the array direction that is greater than or equal to half a length of the array of spectral sensors as aligned in the array direction.

2. The spectral characteristic obtaining apparatus according to claim 1, further comprising:
    a calibration color index conveyor configured to convey the calibration color index in the array direction by a predetermined feed amount or at a predetermined feed speed,
    wherein the calibration color index conveyor conveys the calibration color index to change the relative positions of the plurality of spectral sensors with respect to the calibration color index in the array direction.

3. The spectral characteristic obtaining apparatus according to claim 2, wherein
    the feed amount is greater than or equal to a length corresponding to a spatial range extending in the array direction within which the second color information is obtained by each of the plurality of spectral sensors.

4. The spectral characteristic obtaining apparatus according to claim 2, wherein
    each spectral sensor of the plurality of spectral sensors is configured to obtain the second color information at a predetermined time interval, and a product of the feed speed multiplied by the time interval is greater than or equal to a length corresponding to a spatial range extending in the array direction within which the second color information is obtained by the each spectral sensor of the plurality of spectral sensors.

5. The spectral characteristic obtaining apparatus according to claim 1, wherein the plurality of regions having different colors of the calibration color index are within a color gamut of the object.

6. The spectral characteristic obtaining apparatus according to claim 1, wherein the object is a conveyance object that is conveyed in a direction that is orthogonal to the array direction.

7. The spectral characteristic obtaining apparatus according to claim 1, wherein the program instructions further cause the processor to
    calculate a correction coefficient for correcting the first color information obtained from the object, by using third color information obtained from at least one of a black color index having a region of a black color and a white color index having a region of a white color.

8. The spectral characteristic obtaining apparatus according to claim 1, wherein the program instructions further cause the processor to:
    switch between operation modes that include
        a calibration mode in which to obtain the second color information from the calibration color index, and
        a spectral characteristic obtaining mode in which to obtain the first color information from the object.

9. The spectral characteristic obtaining apparatus according to claim 8, wherein
    the operation mode switching unit has a columnar member having a longer side being in the array direction and rotatable around a rotating axis parallel to the array direction, and is configured to switch the operation modes by rotation of the columnar member.

10. The spectral characteristic obtaining apparatus according to claim 9, wherein
    the columnar member includes a guide portion configured to guide the calibration color index in the array direction.

11. The spectral characteristic obtaining apparatus according to claim 9, wherein
    the columnar member includes a restricting portion configured to restrict movement in a conveyance direction orthogonal to the array direction and in a direction orthogonal to a plane that includes the array direction.

12. The spectral characteristic obtaining apparatus according to claim 9, wherein the object is a conveyance object that is conveyed in the conveyance direction orthogonal to the array direction, and the columnar member has a contact surface that is brought into contact with the conveyance object facing a direction orthogonal to a plane that includes the array direction and the conveyance direction.

13. The spectral characteristic obtaining apparatus according to claim 7, comprising a mode switching unit configured to switch operation modes that include a calibration mode in which to obtain the second color information from the calibration color index, a correction mode in which to obtain the third color information from at least one of a black color index having a region of a black color and a white color index having a region of a white color, and a spectral characteristic obtaining mode in which to obtain the first color information from the object.

14. An image forming apparatus comprising:
the spectral characteristic obtaining apparatus according to claim 1,
wherein an image forming condition is changed based on a spectral characteristic of a surface of an image bearer.

15. An image forming system comprising:
the spectral characteristic obtaining apparatus according to claim 1,
wherein an image forming condition is changed based on a spectral characteristic of a surface of an image bearer.

* * * * *